US012688822B2

(12) United States Patent
Kim et al.

(10) Patent No.: US 12,688,822 B2

(45) Date of Patent: Jul. 21, 2026

(54) LIGHT EMITTING PIXEL CIRCUIT COMPRISING SMALL NUMBER OF TRANSISTORS DRIVEN BY PULSE WIDTH MODULATION PERFORMING INTERNAL COMPENSATION OF THRESHOLD VOLTAGE

(71) Applicant: Samsung Display Co., LTD., Yongin-si (KR)

(72) Inventors: Kwihyun Kim, Yongin-si (KR); Doyeong Park, Yongin-si (KR); Sehyun Lee, Yongin-si (KR); Haksun Chang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/043,441

(22) Filed: Feb. 1, 2025

(65) Prior Publication Data

US 2025/0342796 A1 Nov. 6, 2025

(30) Foreign Application Priority Data

May 2, 2024 (KR) ........................ 10-2024-0058345

(51) Int. Cl.
*G09G 3/32* (2016.01)

(52) U.S. Cl.
CPC ....... *G09G 3/32* (2013.01); *G09G 2300/0819* (2013.01); *G09G 2300/0852* (2013.01);
(Continued)

(58) Field of Classification Search
CPC .......... G09G 3/30; G09G 3/32; G09G 3/3208; G09G 3/3216; G09G 3/3225;
(Continued)

(56) References Cited

U.S. PATENT DOCUMENTS

2012/0119667 A1* 5/2012 Kitazawa ............. G09G 3/3291 315/320
2014/0362062 A1* 12/2014 Limketkai ............ G09G 3/3233 345/82

(Continued)

FOREIGN PATENT DOCUMENTS

KR 1020210131852 A 11/2021
KR 1020220052265 A 4/2022
KR 102562841 B1 8/2023

OTHER PUBLICATIONS

Bernd Richter "OLED-on-CMOS based bidirectional microdisplay for near-to-eye and sensor applications", 2011 IEEE; Downloaded on Dec. 5, 2024 (3 pages).

*Primary Examiner* — Ke Xiao
*Assistant Examiner* — Nelson Lam
(74) *Attorney, Agent, or Firm* — CANTOR COLBURN LLP

(57) ABSTRACT

A pixel circuit includes a first transistor, a second transistor for applying a data voltage to the first transistor, a third transistor for diode-connecting the first transistor, a fourth transistor for applying a first power voltage to a first electrode of the first transistor, a fifth transistor for connecting a second electrode of the first transistor and a fourth node, a sixth transistor for applying an initialization voltage, a seventh transistor, an eighth transistor for applying the data voltage to a fifth node in response to a second scan signal, a tenth transistor for applying a second power voltage to the fifth node, a twelfth transistor for applying the initialization voltage to the fourth node and a light emitting element. A sweep signal is applied to a control electrode of the first transistor, and the sweep signal is a global signal which has same timing across at least two pixel-rows.

26 Claims, 19 Drawing Sheets

(52) U.S. Cl.
CPC ............... *G09G 2300/0861* (2013.01); *G09G 2310/0286* (2013.01); *G09G 2310/066* (2013.01); *G09G 2310/08* (2013.01); *G09G 2320/064* (2013.01); *G09G 2330/023* (2013.01)

(58) Field of Classification Search
CPC .... G09G 3/3233; G09G 3/3241; G09G 3/325; G09G 3/3258; G09G 3/3266; G09G 3/3275; G09G 3/3283; G09G 3/3291
USPC ....................................................... 345/76–83
See application file for complete search history.

(56) References Cited

U.S. PATENT DOCUMENTS

| | | | | |
|---|---|---|---|---|
| 2024/0331602 | A1* | 10/2024 | Kim | G09G 3/20 |
| 2024/0346972 | A1* | 10/2024 | Kim | G09G 3/3233 |
| 2025/0078734 | A1* | 3/2025 | Kim | G09G 3/32 |
| 2025/0087169 | A1* | 3/2025 | Lee | G11C 19/184 |

* cited by examiner

LIGHT EMITTING PIXEL CIRCUIT COMPRISING SMALL NUMBER OF TRANSISTORS DRIVEN BY PULSE WIDTH MODULATION PERFORMING INTERNAL COMPENSATION OF THRESHOLD VOLTAGE

This application claims priority to Korean Patent Application No. 10-2024-0058345, filed on May 2, 2024, and all the benefits accruing therefrom under 35 U.S.C. § 119, the content of which in its entirety is herein incorporated by reference.

BACKGROUND

1. Field

Embodiments of the present invention relate to a pixel circuit and a display apparatus including the same. More particularly, embodiments of the present invention relate to the pixel circuit, which is driven by pulse width modulation, performs internal compensation of threshold voltage, and includes a small number of transistors, applicable to ultra-high resolution display apparatus.

2. Description of the Related Art

Generally, a display apparatus includes a display panel and a display panel driver. The display panel includes a plurality of gate lines, a plurality of data lines, and a plurality of pixels. The display panel driver includes a gate driver providing a gate signal to the gate lines, a data driver providing a data voltage to the data lines, and a driving controller controlling the gate driver, and the data driver.

A conventional pixel circuit driven by pulse width modulation method and performing internal compensation of a threshold voltage may include 19 or more transistors and 3 or more capacitors, so that it is difficult to apply it to an ultra-high-resolution display apparatus due to limitations in integration.

SUMMARY

Embodiments of the present invention provide a pixel circuit which is driven by pulse width modulation, performs internal compensation of threshold voltage, and includes a small number of transistors, applicable to ultra-high resolution display apparatus.

Embodiments of the present invention also provide a display apparatus including the pixel circuit.

According to embodiments, a pixel circuit includes: a first transistor including a control electrode connected to a first node, a first electrode connected to a second node and a second electrode connected to a third node; a second transistor configured to apply a data voltage to the second node in response to a first scan signal; a third transistor configured to connect the first node and the third node in response to the first scan signal; a fourth transistor configured to apply a first power voltage to the second node in response to an emission signal; a fifth transistor configured to connect the third node and a fourth node in response to the emission signal; a sixth transistor configured to apply an initialization voltage to the first node in response to a first initialization signal; a seventh transistor including a control electrode connected to the fourth node, a first electrode connected to a fifth node and a second electrode connected to a sixth node and configured to generate a driving current; an eighth transistor configured to apply the data voltage to the fifth node in response to a second scan signal; a tenth transistor configured to apply a second power voltage to the fifth node in response to the emission signal; a twelfth transistor configured to apply the initialization voltage to the fourth node in response to a second initialization signal; and a light emitting element configured to emit light based on the driving current. The first transistor and the seventh transistor are P-type transistors, and the second transistor, the third transistor and the eighth transistor are N-type transistors. A sweep signal is applied to the first node, and the sweep signal is a global signal which has same timing across at least two pixel-rows.

In an embodiment, the second scan signal, the emission signal, the first initialization signal and the second initialization signal may be the global signal.

In an embodiment, the pixel may further include a ninth transistor configured to connect the fourth node and the sixth node in response to the second scan signal, an eleventh transistor configured to connect the sixth node and a seventh node in response to the emission signal and a thirteenth transistor configured to apply a light emitting element initialization voltage to a first electrode of the light emitting element in response to a light emitting element initialization signal.

In an embodiment, the light emitting element initialization signal may be the global signal.

In an embodiment, the light emitting element may include the first electrode connected to the seventh node and a second electrode configured to receive a third power voltage. The light emitting element initialization voltage may be lower than the third power voltage.

In an embodiment, the fourth transistor, the fifth transistor, the tenth transistor, the eleventh transistor and the thirteenth transistor may be P-type transistors, and the sixth transistor, the ninth transistor and the twelfth transistor may be N-type transistors.

In an embodiment, in an emission-on period, the first transistor may be turned off, and the light emitting element emits light while the seventh transistor is turned on. In an emission-off period following the emission-on period, when the first transistor is turned on, the seventh transistor may be turned off and the light emitting element may stop emitting light.

In an embodiment, a first period of frame period in which the pixel circuit is driven, the first initialization signal may have an activation level, the second initialization signal may have an activation level and the sweep signal may have a high level, and the sixth transistor may be turned on and the twelfth transistor may be turned on.

In an embodiment, in a second period following the first period, the data voltage may have a pulse width data voltage, the first initialization signal may have an inactivation level, the second initialization signal may have an inactivation level, the first scan signal may have an activation level, the second transistor may be turned on, and the third transistor may be turned on.

In an embodiment, in a third period following the second period, the data voltage may have a constant current voltage, the first scan signal may have an inactivation level, the second scan signal may have an activation level, and the eighth transistor may be turned on.

In an embodiment, in a fourth period following the third period, the emission signal may have an activation level, the sweep signal may be decreased from the high level to a low level lower than the high level.

In an embodiment, a frame period in which the pixel circuit is driven may include a writing frame in which a pulse width data voltage is applied to the pixel circuit and the light emitting element emits light and a holding frame in which the pulse width data voltage is not applied and the light emitting element emits light.

In an embodiment, in a first holding period of the holding frame, the sweep signal may have a high level, the first initialization signal may have an inactivation level, the second initialization signal may have an activation level, the emission signal may have an inactivation level, the sixth transistor may be turned off and the twelfth transistor may be turned on.

In an embodiment, in a second holding period following the first holding period, the second initialization signal may have an inactivation level, the first scan signal may have an inactivation level, and the twelfth transistor may be turned off.

In an embodiment, in a third holding period following the second holding period, the data voltage may have a constant current voltage, the second scan signal may have an activation level, and the eighth transistor may be turned on.

In an embodiment, a fourth holding period following the third holding period, the emission signal may have an activation level, the sweep signal may be decreased from the high level to a low level lower than the high level.

In an embodiment, in the first to fourth holding period, the data voltage may have the constant current voltage and the first scan signal may have the inactivation level.

In an embodiment, in the first to fourth holding period, the first initialization signal may have the inactivation level.

According to embodiments, a display apparatus includes a display panel including a pixel circuit, a display region, a first peripheral region and a second peripheral region, a gate driver configured to apply a first scan signal to the display region, a data driver configured to apply a data voltage to the display region, a voltage generator configured to apply a global signal which has same timing across at least two pixel-rows to the display region and a driving controller configured to control the gate driver, the data driver and the voltage generator. The pixel circuit includes a first transistor including a control electrode connected to a first node, a first electrode connected to a second node and a second electrode connected to a third node, a second transistor configured to apply the data voltage to the second node in response to a first scan signal, a third transistor configured to connect the first node and the third node in response to the first scan signal, a fourth transistor configured to apply a first power voltage to the second node in response to an emission signal, a fifth transistor configured to connect the third node and a fourth node in response to the emission signal, a sixth transistor configured to apply an initialization voltage to the first node in response to a first initialization signal, a seventh transistor including a control electrode connected to the fourth node, a first electrode connected to a fifth node and a second electrode connected to a sixth node and configured to generate a driving current, an eighth transistor configured to apply the data voltage to the fifth node in response to a second scan signal, a tenth transistor configured to apply a second power voltage to the fifth node in response to the emission signal, a twelfth transistor configured to apply the initialization voltage to the fourth node in response to a second initialization signal and a light emitting element configured to emit light based on the driving current. The first transistor and the seventh transistor are P-type transistors, and the second transistor, the third transistor and the eighth transistor are N-type transistors. A sweep signal is applied to the first node, and the sweep signal is the global signal.

In an embodiment, the voltage generator may apply a gate clock signal to the gate driver, and apply the emission signal, the first initialization signal, the second initialization signal, the second scan signal and the sweep signal to the display region.

In an embodiment, the gate driver may be disposed on the first peripheral region. The display region nay be disposed between the first peripheral region and the second peripheral region. An emission line configured to receive the emission signal, a first initialization line configured to receive the first initialization signal, a second initialization line configured to receive the second initialization signal, a second scan signal line configured to receive the second scan signal and a sweep signal line configured to receive the sweep signal may be disposed on the second peripheral region.

According to embodiments, a pixel circuit may include a light emitting element, a pulse width driving circuit configured to generate a pulse width signal and a constant current driving circuit configured to control an emission of the light emitting element based on the pulse width signal. The pulse width driving circuit may include a pulse driving transistor configured to generate the pulse width signal based on a sweep signal which is a global signal that has same timing across at least two pixel-rows, a pulse writing transistor configured to apply a data voltage to a first electrode of the pulse driving transistor in response to a first scan signal which is a progressive signal that has different timing across the at least two pixel-rows, a pulse emission control transistor configured to apply a first power voltage to the first electrode of the pulse driving transistor in response to an emission signal and a first initialization transistor configured to apply an initialization voltage to a control electrode of the pulse driving transistor in response to a first initialization signal. The constant current driving circuit may include a constant current driving transistor configured to apply a driving current to the light emitting element in response to the pulse width signal, a constant current writing transistor configured to apply a constant current voltage to a first electrode of the constant current driving transistor in response to a second scan signal, a constant current emission control transistor configured to apply a second power voltage to the first electrode of the constant current driving transistor in response to the emission signal and a second initialization transistor configured to apply the initialization voltage to a control electrode of the constant current driving transistor in response to a second initialization signal. The pulse driving transistor and the constant current driving transistor may be P-type transistors and the pulse writing transistor and the constant current writing transistor may be N-type transistors.

In an embodiment, the emission signal, the first initialization signal, the second initialization signal and the second scan signal may be the global signal.

In an embodiment, the pulse width driving circuit may further include a pulse compensating transistor connected to the control electrode of the pulse driving transistor and a second electrode of the pulse driving transistor. The constant current driving circuit may further include a constant current compensating transistor connected to the control electrode of the constant current driving transistor and a second electrode of the constant current driving transistor.

In an embodiment, the pulse compensating transistor and the constant current compensating transistor may be N-type transistors.

According to embodiments, an electronic device includes a pixel circuit and a power supply configured to provide power to the pixel circuit. The pixel circuit includes: a first transistor including a control electrode connected to a first node, a first electrode connected to a second node and a second electrode connected to a third node; a second transistor configured to apply a data voltage to the second node in response to a first scan signal; a third transistor configured to connect the first node and the third node in response to the first scan signal; a fourth transistor configured to apply a first power voltage to the second node in response to an emission signal; a fifth transistor configured to connect the third node and a fourth node in response to the emission signal; a sixth transistor configured to apply an initialization voltage to the first node in response to a first initialization signal; a seventh transistor including a control electrode connected to the fourth node, a first electrode connected to a fifth node and a second electrode connected to a sixth node and configured to generate a driving current; an eighth transistor configured to apply the data voltage to the fifth node in response to a second scan signal; a tenth transistor configured to apply a second power voltage to the fifth node in response to the emission signal; a twelfth transistor configured to apply the initialization voltage to the fourth node in response to a second initialization signal; and a light emitting element configured to emit light based on the driving current. The first transistor and the seventh transistor are P-type transistors, and the second transistor, the third transistor and the eighth transistor are N-type transistors. A sweep signal is applied to the first node, and the sweep signal is a global signal which has same timing across at least two pixel-rows.

As described above, the pixel circuit may include 13 transistors and 2 capacitors. The pixel circuit may be driven by pulse width modulation, perform an internal compensation of threshold voltage, and include a small number of transistors compared with conventional pixel circuit, so that the pixel circuit may have a high integration. Accordingly, the pixel circuit may be applied to an ultra-high resolution display apparatus.

Additionally, some transistors included in the pixel circuit may be N-type transistors, so that a power consumption may be effectively reduced. Accordingly, the pixel circuit may be stably operated by using low power voltage. Additionally, a power consumption of the display apparatus may be reduced.

Additionally, some transistors of the pixel circuit may be P-type transistors, so that mobility may be effectively improved.

Additionally, some input signals applied to the pixel circuit may be the global signal which is a simultaneous signal having the same timing regardless of pixel-row, so that a power consumption of the display apparatus may be effectively reduced.

Additionally, the emission signal may be the global signal, so that the display apparatus may not include an emission driver. Accordingly, an integration of the display apparatus may be further improved. Additionally, a power consumption may be further improved.

Additionally, the pixel circuit may be driven as a variable frequency, so that a power consumption of the display apparatus may be effectively reduced.

Additionally, in a holding frame, some input signals may have DC voltage, so that a power consumption of the display apparatus may be further reduced.

BRIEF DESCRIPTION OF THE DRAWINGS

Illustrative, non-limiting embodiments will be more clearly understood from the following detailed description in conjunction with the accompanying drawings.

DETAILED DESCRIPTION

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. Hereinafter, the present invention will be explained in detail with reference to the accompanying drawings.

Figure 1:
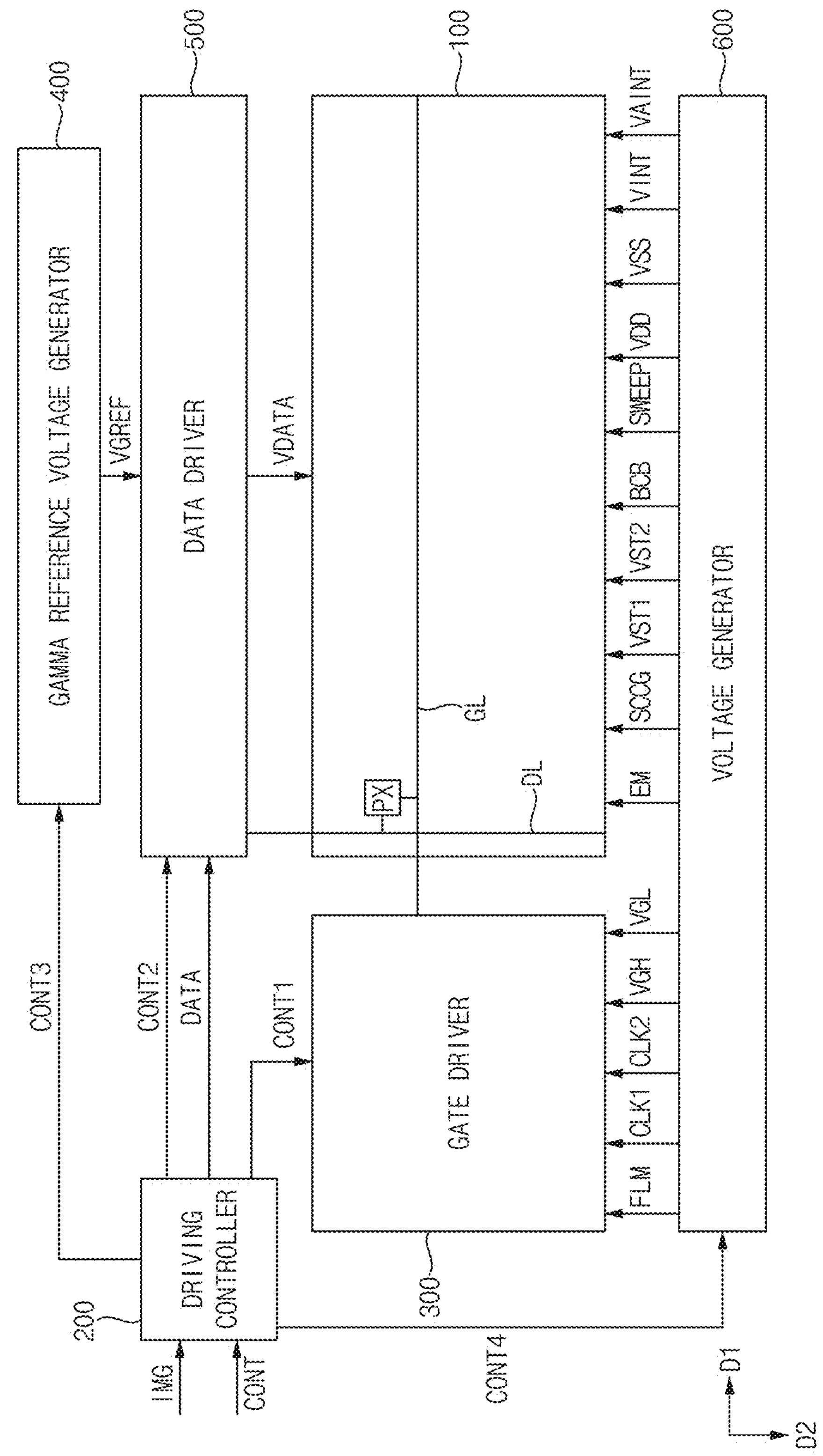
FIG. 1 is a block diagram illustrating a display apparatus according to embodiments of the present invention.

FIG. 1 is a block diagram illustrating a display apparatus according to embodiments of the present invention.

Referring to FIG. 1, the display apparatus includes a display panel 100 and a display panel driver. The display panel driver includes a driving controller 200, a gate driver 300, a gamma reference voltage generator 400, a data driver 500 and a voltage generator 600.

The display panel 100 has a display region on which an image is displayed and a peripheral region adjacent to the display region.

The display panel 100 includes a plurality of gate lines GL, a plurality of data lines DL and a plurality of pixels PX electrically connected to the gate lines GL and the data lines DL. The gate lines GL may extend in a first direction D1, and the data lines DL may extend in a second direction D2 crossing the first direction D1. In an embodiment, the plurality of pixels PX may be arranged in a matrix form. A "pixel-row" may mean pixels arranged in the same row of the matrix among the plurality of pixels PX, and the plurality of pixels PX may include several pixel-rows arranged in a column direction of the matrix.

The driving controller 200 receives input image data IMG and an input control signal CONT from an external apparatus. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal FLM and a gate clock signal.

In an embodiment, the gate driver 300 may receive the vertical start signal FLM received from the driving controller 200, and a high voltage VGH, a low voltage VGL and the gate clock signal from the voltage generator 600. The gate clock signal may include a first clock signal CLK1 and a second clock signal CLK2. The low voltage VGL may be lower than the high voltage VGH.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT and outputs the third control signal CONT3 to the gamma reference voltage generator 400.

The driving controller 200 generates the fourth control signal CONT4 for controlling an operation of the voltage generator 600 based on the input control signal CONT, and outputs the fourth control signal CONT4 to the voltage generator 600.

The gate driver 300 generates gate signals driving the gate lines GL in response to the first control signal CONT1 received from the driving controller 200. The gate driver 300 may output the gate signals to the gate lines GL. For example, the gate driver 300 may sequentially output a first scan signal SPWM of FIG. 2 to the gate lines GL.

Figure 2:
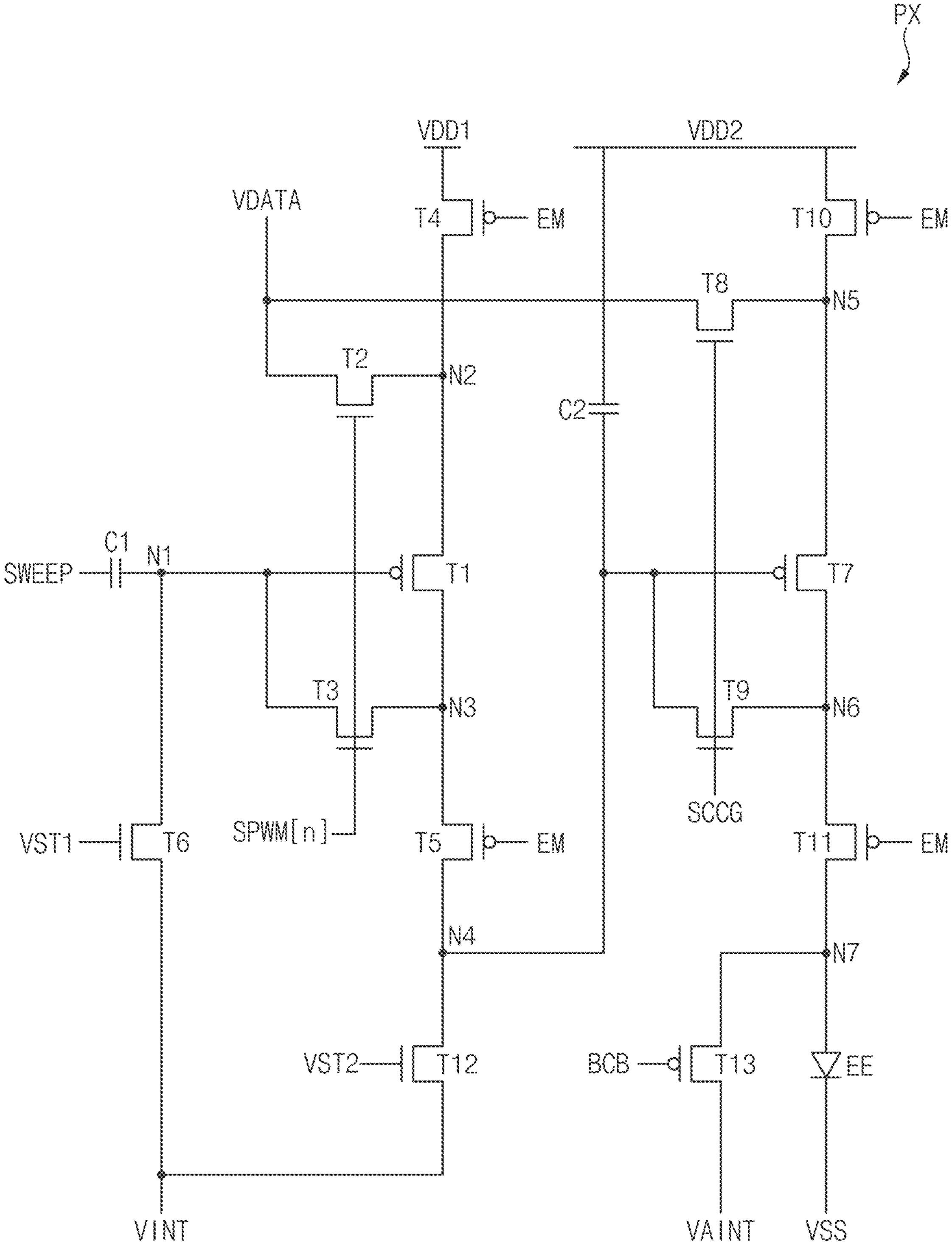
FIG. 2 is a circuit diagram illustrating an example of a pixel circuit of a display panel of FIG. 1.

In the present embodiment, the first scan signal SPWM of FIG. 2 may be a progressive signal which has a different timing across each pixel-rows. Herein, [n] may mean an n-th pixel-row. A pixel circuit of FIG. 2 which receives the first scan signal SPWM[n] may be a pixel circuit included in the n-th pixel-row. For example, the progressive signal may have a different timing across at least two pixel-rows In an embodiment, the gate driver 300 may be disposed in the peripheral region. In an embodiment, the gate driver 300 may be integrated in the peripheral region. In an embodiment, the gate driver 300 may be located on the peripheral region.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

For example, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages VDATA having an analog type using the gamma reference voltages VGREF. The data driver 500 outputs the data voltages VDATA to the data lines DL. In the present embodiment, the data voltage VDATA of FIG. 2 may include a pulse width data voltage level VPWM of FIG. 3 and a constant current voltage VCCG of FIG. 3.

In an embodiment, the data driver 500 may be disposed in the peripheral region. In an embodiment, the data driver 500 may be integrated in the peripheral region.

The voltage generator 600 generates a global signal and a power voltage in response to the fourth control signal CONT4 received from the driving controller 200. The "global signal" may be a simultaneous signal having the same timing regardless of pixel-row. For example, the global signal may have same timing across at least two pixel-rows. The global signal may include an emission signal EM, a second scan signal SCCG, a first initialization signal VST1, a second initialization signal VST2 and a sweep signal SWEEP. In an embodiment, the global signal may further include a light emitting element initialization signal BCB.

The power voltage may include a high power voltage VDD, a third power voltage VSS, an initialization voltage VINT and a light emitting element initialization voltage VAINT. The high power voltage VDD may include a first power voltage VDD1 of FIG. 2 and a second power voltage VDD2 of FIG. 2 different from the first power voltage VDD1 of FIG. 2. The third power voltage VSS may be lower than the high power voltage VDD.

FIG. 2 is a circuit diagram illustrating an example of a pixel circuit PX of a display panel 100 of FIG. 1.

Referring to FIG. 2, in the present embodiment, the pixel circuit PX may include a first transistor T1, a second transistor T2, a third transistor T3, a fourth transistor T4, a fifth transistor T5, a sixth transistor T6, a seventh transistor T7, an eighth transistor T8, a ninth transistor T9, a tenth transistor T10, an eleventh transistor T11, a twelfth transistor T12, a thirteenth transistor T13, a first capacitor C1, a second capacitor C2 and a light emitting element EE. For example, the pixel circuit PX may have a 13T2C (thirteen transistors and two capacitors) structure.

The first transistor T1 may include a control electrode connected to a first node N1, a first electrode connected to a second node N2 and a second electrode connected to a third node N3. The first transistor T1 may generate a pulse width signal in response to the sweep signal SWEEP. For example, the first transistor T1 may be called as a "pulse driving transistor".

The second transistor T2 may include a control electrode configured to receive the first scan signal SPWM[n], a first electrode configured to receive the data voltage VDATA and a second electrode connected to the second node N2. The second transistor T2 may apply the data voltage VDATA to the first transistor T1 in response to the first scan signal SPWM[n]. For example, the second transistor T2 may be called as a "pulse writing transistor".

The third transistor T3 may include a control electrode configured to receive the first scan signal SPWM[n], a first electrode connected to the third node N3 and a second electrode connected to the first node N1. The third transistor T3 may connect the first node N1 and the third node N3 in response to the first scan signal SPWM[n]. For example, the third transistor may diode-connect the first transistor T1 in response to the first scan signal SPWM[n]. For example, the third transistor T3 may be called as a "pulse compensating transistor".

The fourth transistor T4 may include a control electrode configured to receive the emission signal EM, a first electrode configured to receive the first power voltage VDD1 and a second electrode connected to the second node N2. The fourth transistor T4 may apply the first power voltage VDD1 to the second node N2 in response to the emission signal EM. For example, the fourth transistor T4 may be called as a "pulse emission control transistor".

The fifth transistor T5 may include a control electrode configured to receive the emission signal EM, a first electrode connected to the third node N3 and a second electrode connected to a fourth node N4. The fifth transistor T5 may connect the third node N3 and the fourth node N4 in response to the emission signal EM. For example, when the emission signal EM has an activation level and the first transistor T1 is turned on, the fifth transistor T5 may apply the first power voltage VDD1 to the fourth node N4.

The sixth transistor T6 may include a control electrode configured to receive the first initialization signal VST1, a first electrode configured to receive the initialization voltage VINT and the second electrode connected to the first node N1. The sixth transistor T6 may apply the initialization voltage VINT to the first node N1 in response to the first initialization signal VST1. For example, the initialization voltage VINT may be a voltage such that the first transistor T1 is turned on. For example, the sixth transistor T6 may be called as a "first initialization transistor".

The seventh transistor T7 may include a control electrode connected to the fourth node N4, a first electrode connected to a fifth node N5 and a second electrode connected to a sixth node N6. The seventh transistor T7 may generate a driving current based on the constant current voltage VCCG of FIG. 3. The seventh transistor T7 may output the driving current in response to the pulse width signal, which is a voltage applied to the fourth node N4. For example, the seventh transistor T7 may be called as a "constant current driving transistor".

The eighth transistor T8 may include a control electrode configured to receive the second scan signal SCCG, a first electrode configured to receive the data voltage VDATA and a second electrode connected to the fifth node N5. The eighth transistor T8 may apply the data voltage VDATA to the seventh transistor T7 in response to the second scan signal SCCG. For example, the eighth transistor T8 may be called as a "constant current writing transistor".

The ninth transistor T9 may include a control electrode configured to receive the second scan signal SCCG, a first electrode connected to the sixth node N6 and a second electrode connected to the fourth node N4. The ninth transistor T9 may connect the fourth node N4 and the sixth node N6 in response to the second scan signal SCCG. For example, the ninth transistor T9 may diode-connect the seventh transistor T7 in response to the second scan signal SCCG. For example, the ninth transistor T9 may be called as a "constant current compensating transistor".

The tenth transistor T10 may include a control electrode configured to receive the emission signal EM, a first electrode configured to receive the second power voltage VDD2 and a second electrode connected to the fifth node N5. The tenth transistor T10 may apply the second power voltage VDD2 to the fifth node N5 in response to the emission signal EM. For example, the tenth transistor T10 may called as a "constant current emission control transistor".

The eleventh transistor T11 may include a control electrode configured to receive the emission signal EM, a first electrode connected to the sixth node N6 and a second electrode connected to a seventh node N7. The eleventh transistor T11 may connect the sixth node N6 and the seventh node N7 in response to the emission signal EM. For example, when the emission signal EM has an activation level, the eleventh transistor T11 may apply the driving current to the light emitting element EE.

The twelfth transistor T12 may include a control electrode configured to receive the second initialization signal VST2, a first electrode configured to receive the initialization voltage VINT and a second electrode connected to the fourth node N4. The twelfth transistor T12 may apply the initialization voltage VINT to the fourth node N4 in response to the second initialization signal VST2. For example, the twelfth transistor T12 may initialize the fourth node N4 in response to the second initialization signa VST2. For example, the initialization voltage VINT may be a voltage such that the seventh transistor T7 is turned on. For example, the twelfth transistor T12 may be called as a "second initialization transistor".

The thirteenth transistor T13 may include a control electrode configured to receive the light emitting element initialization signal BCB, a first electrode configured to receive the light emitting element initialization voltage VAINT and a second electrode connected to the seventh node N7. The thirteenth transistor T13 may apply the light emitting element initialization voltage VAINT to the seventh node N7 in response to the light emitting element initialization signal BCB. For example, the thirteenth transistor T13 may be called as a "light emitting element initialization transistor". For example, the light emitting element initialization voltage VAINT may be lower than the third power voltage VSS. When the light emitting element initialization voltage VAINT is lower than the third power voltage VSS, a leakage flowing through the light emitting element EE may be reduced. Accordingly, a black characteristic of the pixel circuit PX may be effectively improved.

The first capacitor C1 may include a first electrode configured to receive the sweep signal SWEEP and a second electrode connected to the first node N1.

The second capacitor C2 may include a first electrode configured to receive the second power voltage VDD2 and a second electrode connected to the fourth node N4.

The light emitting element EE may include a first electrode connected to the seventh node N7 and a second electrode configured to receive the third power voltage VSS. For example, the first electrode of the light emitting element EE may be an anode. For example, the second electrode of the light emitting element EE may be a cathode. The light emitting element EE may emit light based on the driving current. For example, the light emitting element EE may be an emitting diode. In an embodiment, the light emitting element EE may be a micro light emitting diode.

In an embodiment, the pixel circuit PX may include a pulse width driving circuit and a constant current driving circuit.

The "pulse width driving circuit" may include the first transistor T1, the second transistor T2, the third transistor T3, the fourth transistor T4, the fifth transistor T5, the sixth transistor T6 and a first capacitor C1.

The "constant current driving circuit" may include the seventh transistor T7, the eighth transistor T8, the ninth transistor T9, the tenth transistor T10, the eleventh transistor T11, the twelfth transistor T12, the thirteenth transistor T13 and the second capacitor C2.

In the present embodiment, the first transistor T1, the fourth transistor T4, the fifth transistor T5, the seventh transistor T7, the tenth transistor T10, the eleventh transistor T11 and the thirteenth transistor T13 may be P-type transistors. The second transistor T2, the third transistor T3, the sixth transistor T6, the eighth transistor T8, the ninth transistor T9 and the twelfth transistor T12 may be N-type transistors. For example, the P-type transistor may be a low temperature poly silicon ("LTPS") transistor. For example, the N-type transistor may be an oxide transistor.

In the present embodiment, the second transistor T2, the third transistor T3, the sixth transistor T6, the eighth transistor T8, the ninth transistor T9 and the twelfth transistor T12 may be N-type transistor. Accordingly, a current leakage of the second transistor T2, the third transistor T3, the sixth transistor T6, the eighth transistor T8, the ninth transistor T9 and the twelfth transistor T12 is reduced, so that the pixel circuit PX may be stably operated by using low power voltage. So, through the second transistor T2, the third transistor T3, the sixth transistor T6, the eighth transistor T8, the ninth transistor T9 and the twelfth transistor T12, a power consumption of the display apparatus may be effectively reduced.

Figure 3:
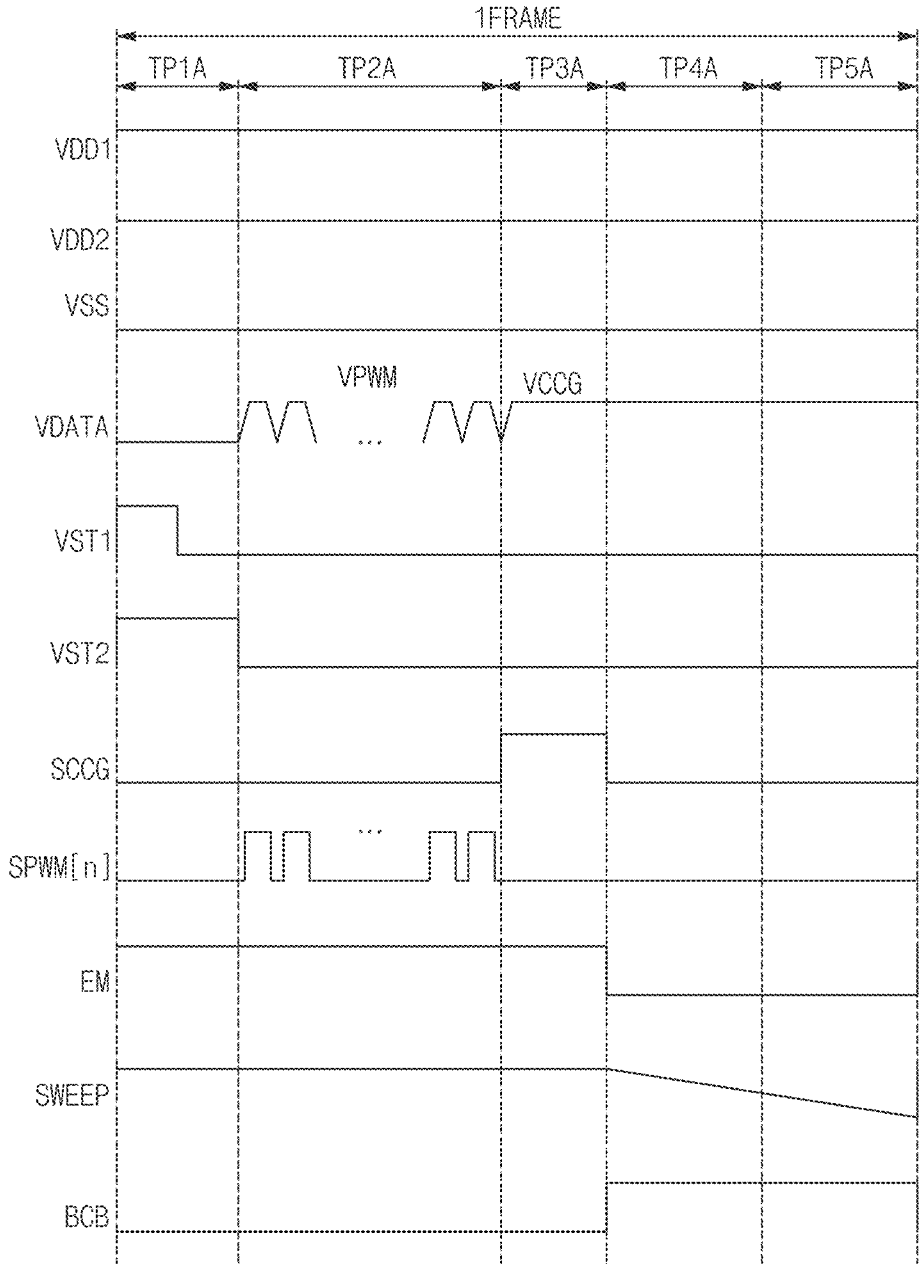
FIG. 3 is a timing diagram illustrating a timing of signals applied to the pixel circuit of FIG. 2.

FIG. 3 is a timing diagram illustrating a timing of signals applied to the pixel circuit PX of FIG. 2.

Referring to FIG. 3, a frame period (1FRAME) may include a first period TP1A, a second period TP2A, a third period TP3A, a fourth period TP4A and a fifth period TP5A.

In the first period TP1A, the first initialization signal VST1 may have an activation level, the second initialization signal VST2 may have an activation level, the first scan signal SPWM[n] may have an inactivation level, the second scan signal SCCG may have an inactivation level, the emission signal EM may have an inactivation level the sweep signal SWEEP may have a high level and the light emitting element initialization signal BCB may have an activation level.

Herein, when a transistor is a P-type transistor, an activation level may be a low level, and an inactivation level may be a high level. Additionally, when a transistor is an N-type transistor, an activation level is a high level, and an inactivation level is a low level.

In the second period TP2A following the first period TP1A, the data voltage VDATA may have the pulse width data voltage VPWM, the first initialization signal VST1 may have an inactivation level, the second initialization signal VST2 may have an inactivation level, the first scan signal SPWM[n] may have an activation level, the second scan signal SCCG may have an inactivation level, the emission signal EM may have an inactivation level the sweep signal SWEEP may have the high level and the light emitting element initialization signal BCB may have an activation level. In the second period TP2A, the first scan signal SPWM[n] may be sequentially applied to pixel-rows.

In the third period TP3A following the second period TP2A, the data voltage VDATA may have the constant current voltage VCCG, the first initialization signal VST1 may have an inactivation level, the second initialization signal VST2 may have an inactivation level, the first scan signal SPWM[n] may have an inactivation level, the second scan signal SCCG may have an activation level, the emission signal EM may have an inactivation level the sweep signal SWEEP may have the high level and the light emitting element initialization signal BCB may have an activation level.

In the fourth period TP4A following the third period TP3A, the first initialization signal VST1 may have an inactivation level, the second initialization signal VST2 may have an inactivation level, the first scan signal SPWM[n] may have an inactivation level, the second scan signal SCCG may have an inactivation level, the emission signal EM may have an activation level the sweep signal SWEEP may be gradually decreased from the high level to a low level lower than the high level and the light emitting element initialization signal BCB may have an inactivation level. The fourth period TP4A may be called as an "emission-on period".

In the fifth period TP5A following the fourth period TP4A, the first initialization signal VST1 may have an inactivation level, the second initialization signal VST2 may have an inactivation level, the first scan signal SPWM[n] may have an inactivation level, the second scan signal SCCG may have an inactivation level, the emission signal EM may have an activation level the sweep signal SWEEP may be gradually decreased to the low level lower and the light emitting element initialization signal BCB may have an inactivation level. The fifth period TP5A may be called as an "emission-off period".

Figure 4:
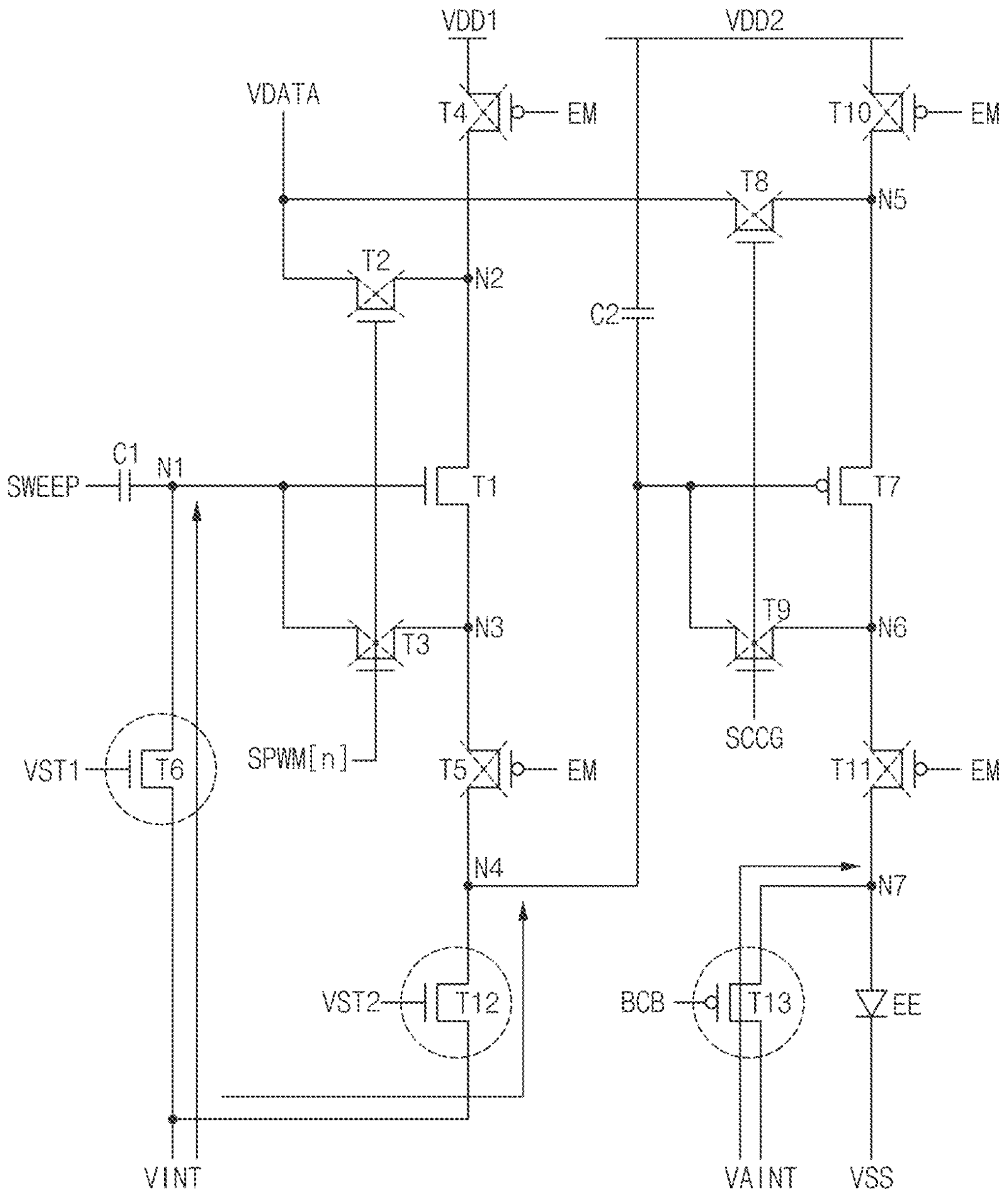
FIG. 4 is a circuit diagram illustrating an operation of the pixel circuit of FIG. 2 in a first period.

FIG. 4 is a circuit diagram illustrating an operation of the pixel circuit PX of FIG. 2 in a first period TP1A.

Referring to FIG. 3 and FIG. 4, in the first period TP1A, the sixth transistor T6 may be turned on in response to the first initialization signal VST1. Accordingly, the initialization voltage VINT may be applied to the first node N1. Accordingly, the first node N1 may be initialized. For example, the first node N1 may be initialized as the initialization voltage VINT.

In the first period TP1A, the thirteenth transistor T13 may be turned on in response to the light emitting element initialization signal BCB. Accordingly, the light emitting element initialization voltage VAINT may be applied to the seventh node N7. Accordingly, the seventh node N7 may be initialized as the light emitting element initialization voltage VAINT.

In the first period TP1A, the first transistor Tl may be turned on in response to a voltage of the first node N1. Additionally, the seventh transistor T7 may be turned on in response to a voltage of the fourth node N4.

Figure 5:
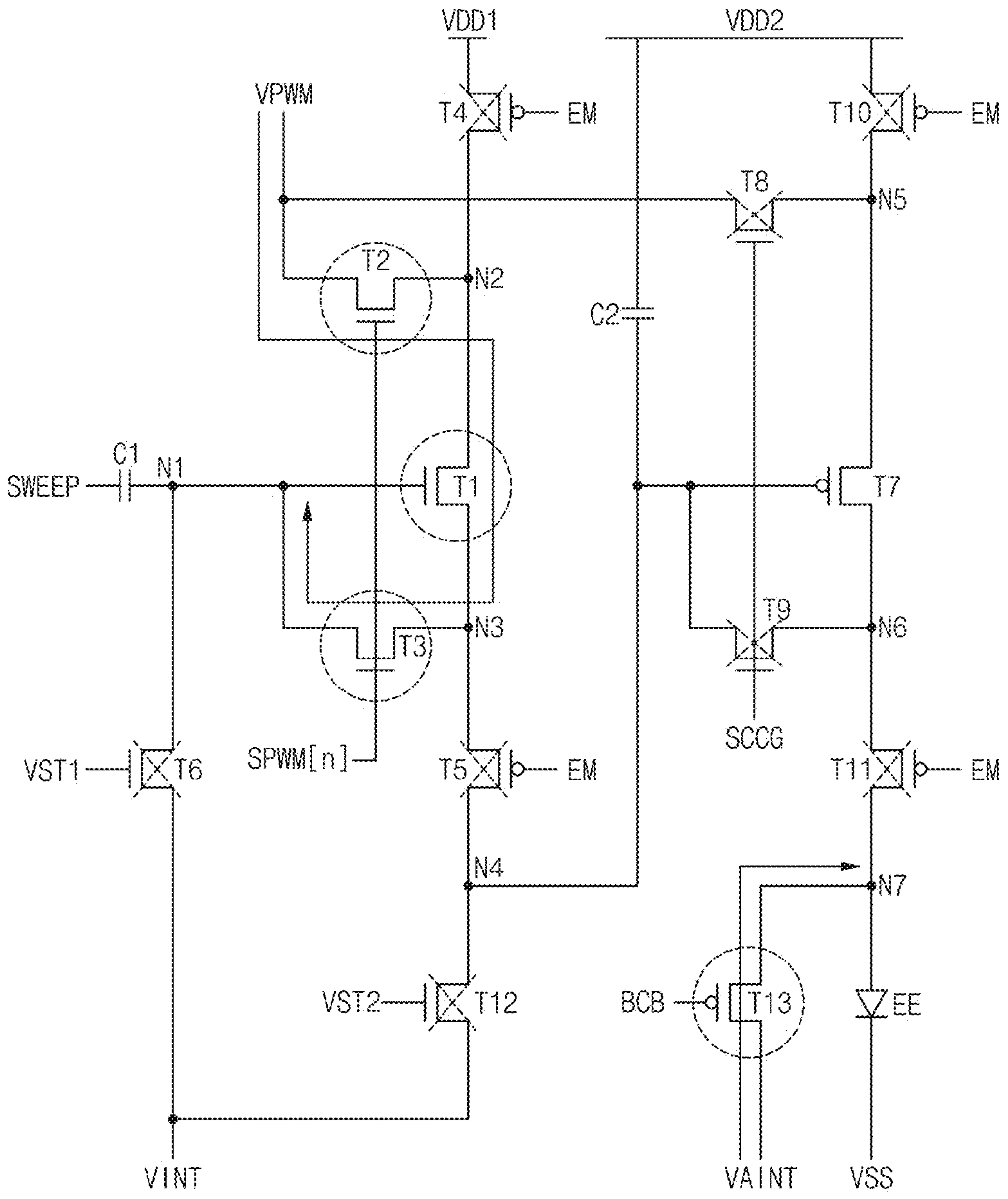
FIG. 5 is a circuit diagram illustrating an operation of the pixel circuit of FIG. 2 in a second period.

FIG. 5 is a circuit diagram illustrating an operation of the pixel circuit PX of FIG. 2 in a second period TP2A.

Referring to FIG. 3 and FIG. 5, in the second period TP2A, the data voltage VDATA may have the pulse width data voltage VPWM. The pulse width data voltage VPWM may have the same or different voltage level with another pixel according to an emission intensity of each pixel. In an embodiment, the pulse width data voltage VPWM may have a pulse shape (e.g., trapezoidal shape) periodically repeated during the second period TP2A.

In the second period TP2A, the second transistor T2 may be turned on in response to the first scan signal SPWM[n]. The second transistor T2 may apply the pulse width data voltage VPWM to the second node N2. In an embodiment, the first scan signal SPWM[n] may have a pulse shape (e.g., square wave shape) periodically repeated and synchronized with the pulse width data voltage VPWM during the second period TP2A so that when the second transistor T2 is turned on in response to the first scan signal SPWM[n], the second transistor T2 may apply the pulse width data voltage VPWM of a high level to the second node N2. Such a state of the first scan signal SPWM[n] may be considered as "an activation level" of the first scan signal SPWM[n].

In the second period TP2A, the third transistor T3 may be turned on in response to the first scan signal SPWM[n]. Accordingly, the pulse width data voltage VPWM may be applied to the second node N2. Additionally, the first transistor T1 may be turned on in response to a voltage of the first node N1. Additionally, the third transistor T3 may diode-connect the first transistor T1, so that a voltage which a threshold voltage of the first transistor T1 is compensated may be applied to the first node N1. For example, a pulse width compensated voltage which is sum of the pulse width data voltage VPWM and the threshold voltage of the first transistor T1 may be applied to the first node N1.

In the second period TP2A, the thirteenth transistor T13 may be turned on in response to the light emitting element initialization signal BCB. Accordingly, the light emitting element initialization voltage VAINT may be applied to the seventh node N7.

Figure 6:
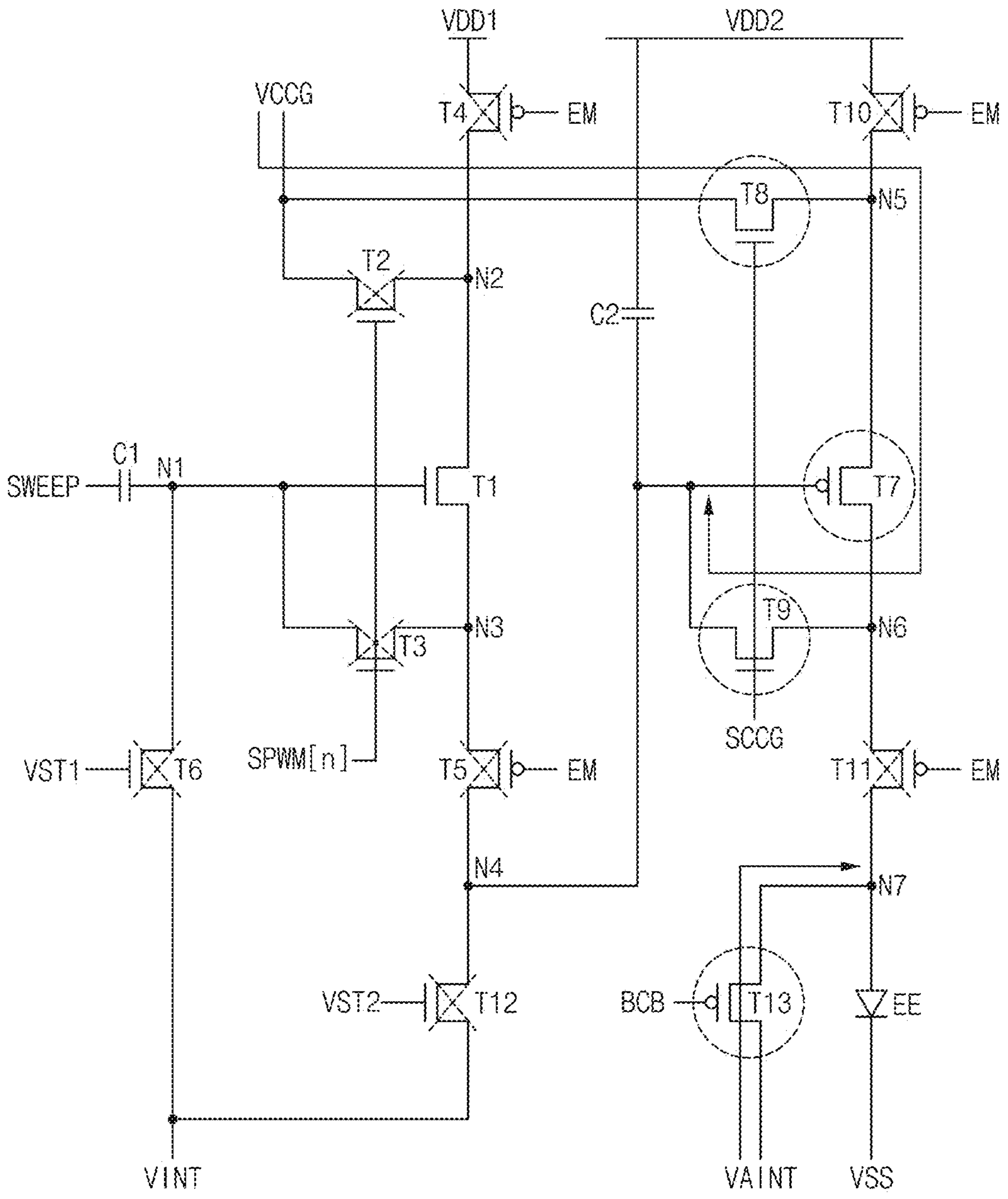
FIG. 6 is a circuit diagram illustrating an operation of the pixel circuit of FIG. 2 in a third period.

FIG. 6 is a circuit diagram illustrating an operation of the pixel circuit PX of FIG. 2 in a third period TP3A.

Referring to FIG. 3 and FIG. 6, in the third period TP3A, the data voltage VDATA may have the constant current voltage VCCG. The constant current voltage VCCG may have the same voltage level for all pixels. Alternatively, the constant current voltage VCCG may have a first voltage level for a red pixel, a second voltage level different from the first voltage level for a green pixel, and a third voltage level different from the first voltage level and the second voltage level for a blue pixel.

In the third period TP3A, the eighth transistor T8 may be turned on in response to the second scan signal SCCG. The eighth transistor T8 may apply the constant current voltage VCCG to the fifth node N5.

In the third period TP3A, the ninth transistor T9 may be turned on in response to the second scan signal SCCG. Accordingly, the constant current voltage VCCG may be applied to the fifth node N5. Additionally, the seventh transistor T7 may be turned on in response to a voltage of the fourth node N4. Additionally, the ninth transistor T9 may diode-connect the seventh transistor T7, so that a voltage which a threshold voltage of the seventh transistor T7 is compensated may be applied to the fourth node N4. For example, a constant current compensated voltage which is a sum of the constant current voltage VCCG and the threshold voltage of the seventh transistor T7 may be applied to the fourth node N4.

In the third period TP3A, the thirteenth transistor T13 may be turned on in response to the light emitting element initialization signal BCB. Accordingly, the light emitting element initialization voltage VAINT may be applied to the seventh node N7.

Figure 7:
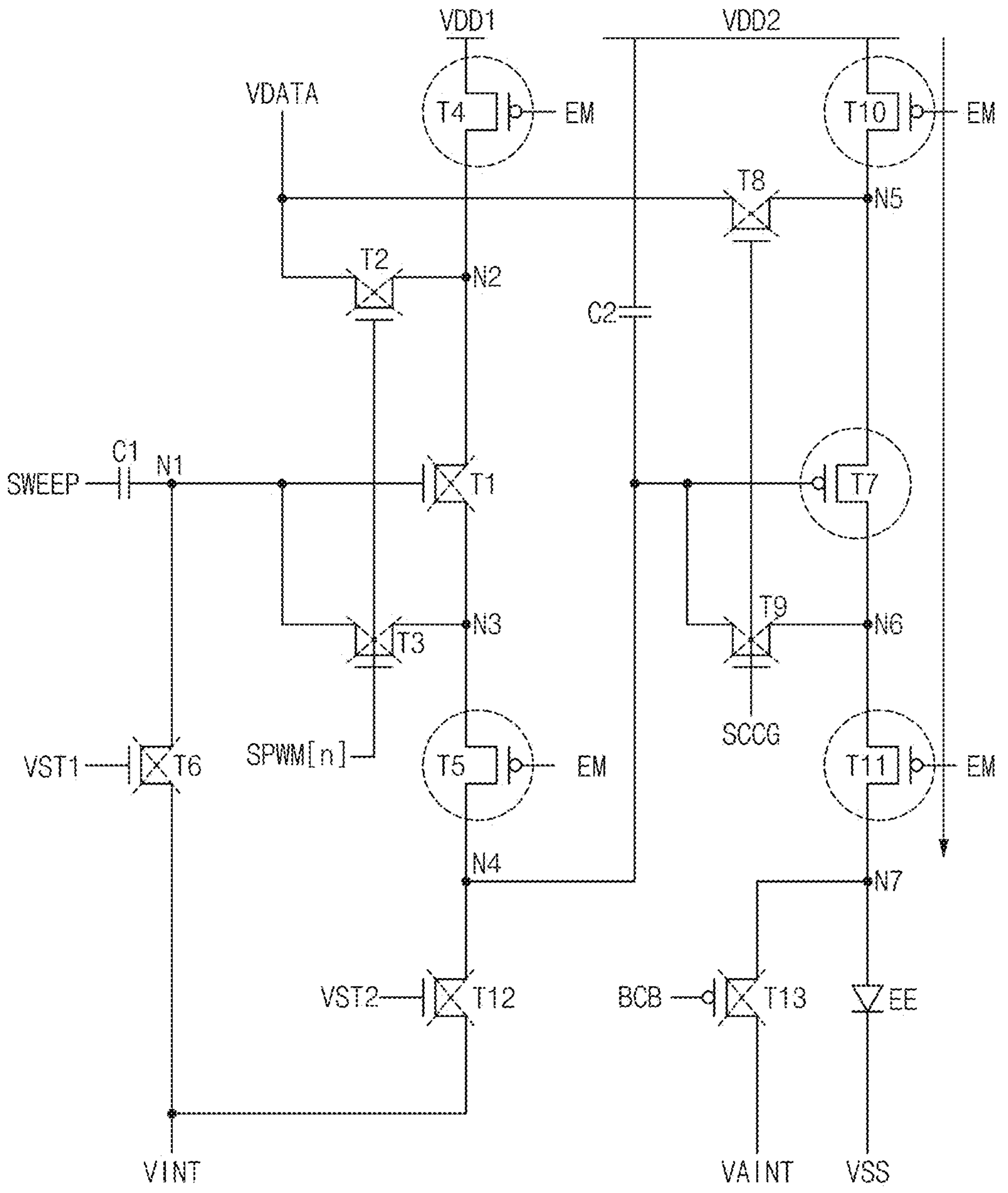
FIG. 7 is a circuit diagram illustrating an operation of the pixel circuit of FIG. 2 in a fourth period.

FIG. 7 is a circuit diagram illustrating an operation of the pixel circuit PX of FIG. 2 in a fourth period TP4A.

Referring to FIG. 3 and FIG. 7, in the fourth period TP4A, the fourth transistor T4 may be turned on in response to the emission signal EM. In the fourth period TP4A, the fifth transistor T5 may be turned on in response to the emission signal EM. In the fourth period TP4A, the tenth transistor T10 may be turned on in response to the emission signal EM. In the fourth period TP4A, the eleventh transistor T11 may be turned on in response to the emission signal EM. Additionally, the thirteenth transistor T13 may be turned off in response to the light emitting element initialization signal BCB. Accordingly, the driving current may be applied to the light emitting element EE. Accordingly, the light emitting element EE may emit light.

In the fourth period TP4A, the sweep signal SWEEP may be gradually decreased from the high level to the low level. Accordingly, a voltage of the first node N1 may be gradually decreased.

Figure 8:
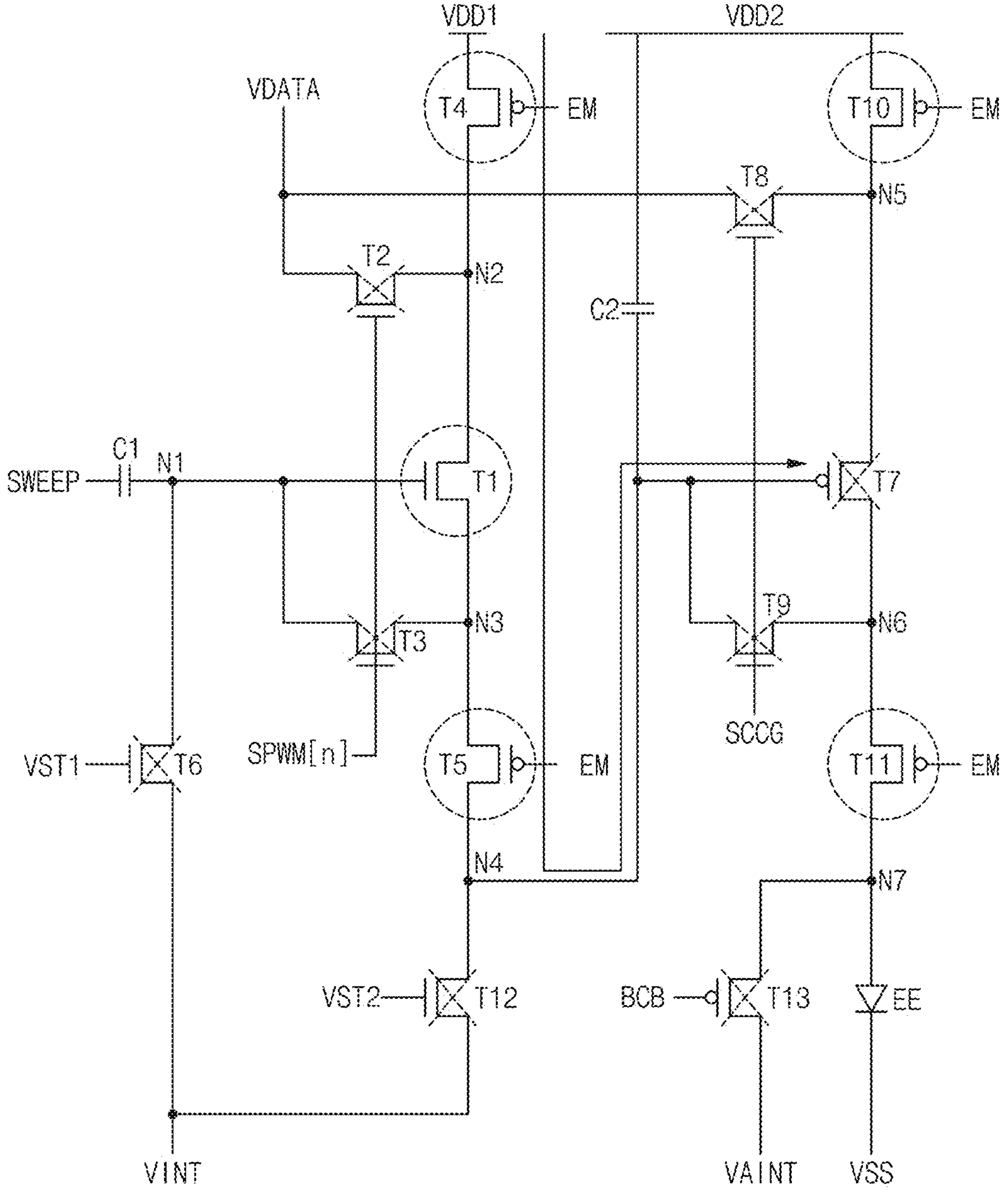
FIG. 8 is a circuit diagram illustrating an operation of the pixel circuit of FIG. 2 in a fifth period.

FIG. 8 is a circuit diagram illustrating an operation of the pixel circuit PX of FIG. 2 in a fifth period TP5A.

Referring to FIG. 3 and FIG. 8, in the fifth period TP5A, the sweep signal SWEEP may be gradually decreased to the low level. The voltage of the first node N1 may be gradually decreased. When the voltage of the first node N1 is lower than the threshold voltage of the first transistor T1, the first transistor T1 may be turned on. When the first transistor T1 is turned on, the first power voltage VDD1 may be applied to the fourth node N4. When the first power voltage VDD1 is applied to the fourth node N4, the seventh transistor T7 may be turned off. When the seventh transistor T7 is turned off, the light emitting element EE may stop emitting. In the fifth period TP5A, a voltage applied to the fourth node N4 may be the pulse width signal.

A timepoint in which the first transistor T1 is turned on may be determined by the pulse width data voltage VPWM applied to the control electrode of the first transistor T1.

According to the present embodiment, the pixel circuit PX may include 13 transistors and 2 capacitors. The pixel circuit PX which is driven by pulse width modulation, performs internal compensation of threshold voltage, and includes a small number of transistors, so that an integration of pixel circuit PX may be effectively improved. Accordingly, the pixel circuit PX may be applicable to ultra-high resolution display apparatus.

Additionally, the second transistor T2, the third transistor T3, the sixth transistor T6, the eighth transistor T8, the ninth transistor T9 and the twelfth transistor T12 included in the pixel circuit PX may be N-type transistors. Accordingly, the pixel circuit PX may be stably operated by using low power voltage. So, through the second transistor T2, the third transistor T3, the sixth transistor T6, the eighth transistor T8, the ninth transistor T9 and the twelfth transistor T12, a power consumption of the display apparatus may be effectively reduced.

Additionally, the first transistor T1 and the seventh transistor T7 may be P-type transistors, so that a mobility may be effectively improved.

Additionally, the light emitting element initialization voltage VAINT applied to the first electrode of the thirteenth transistor T13 may be lower than the third power voltage VSS applied to the cathode of the light emitting element EE, a black characteristic of the pixel circuit PX may be effectively improved.

Additionally, the sweep signal SWEEP may be the global signal, so that a power consumption of the display apparatus may be effectively reduced. Additionally, the first initialization signal VST1, the second initialization signal VST2, the second scan signal SCCG, the emission signal EM and the light emitting element initialization signal BCB may be the global signal, so that a power consumption of the display apparatus may be further improved.

Additionally, the emission signal EM may be the global signal, so that the display apparatus may not include an emission driver. Accordingly, an integration of the display apparatus may be further improved. Additionally, a power consumption may be further improved.

Figure 9:
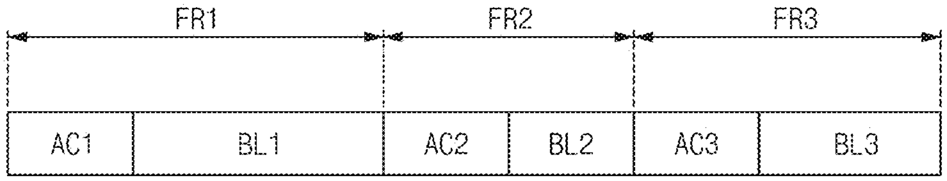
FIG. 9 is a conceptual diagram illustrating a driving frequency of the display panel of FIG. 1.
Figure 10:
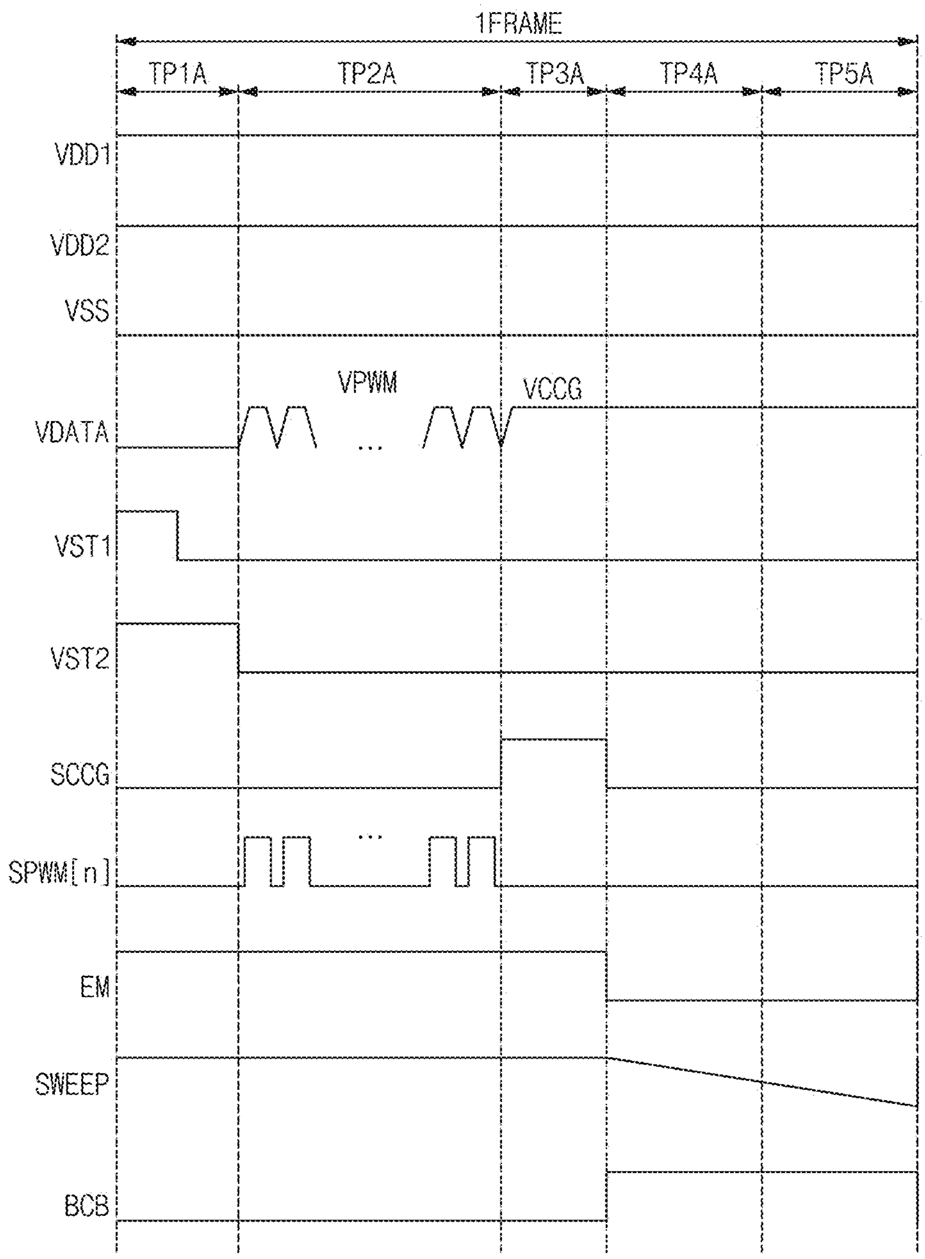
FIG. 10 is a timing diagram illustrating a timing applied to the pixel circuit in a writing frame.
Figure 11:
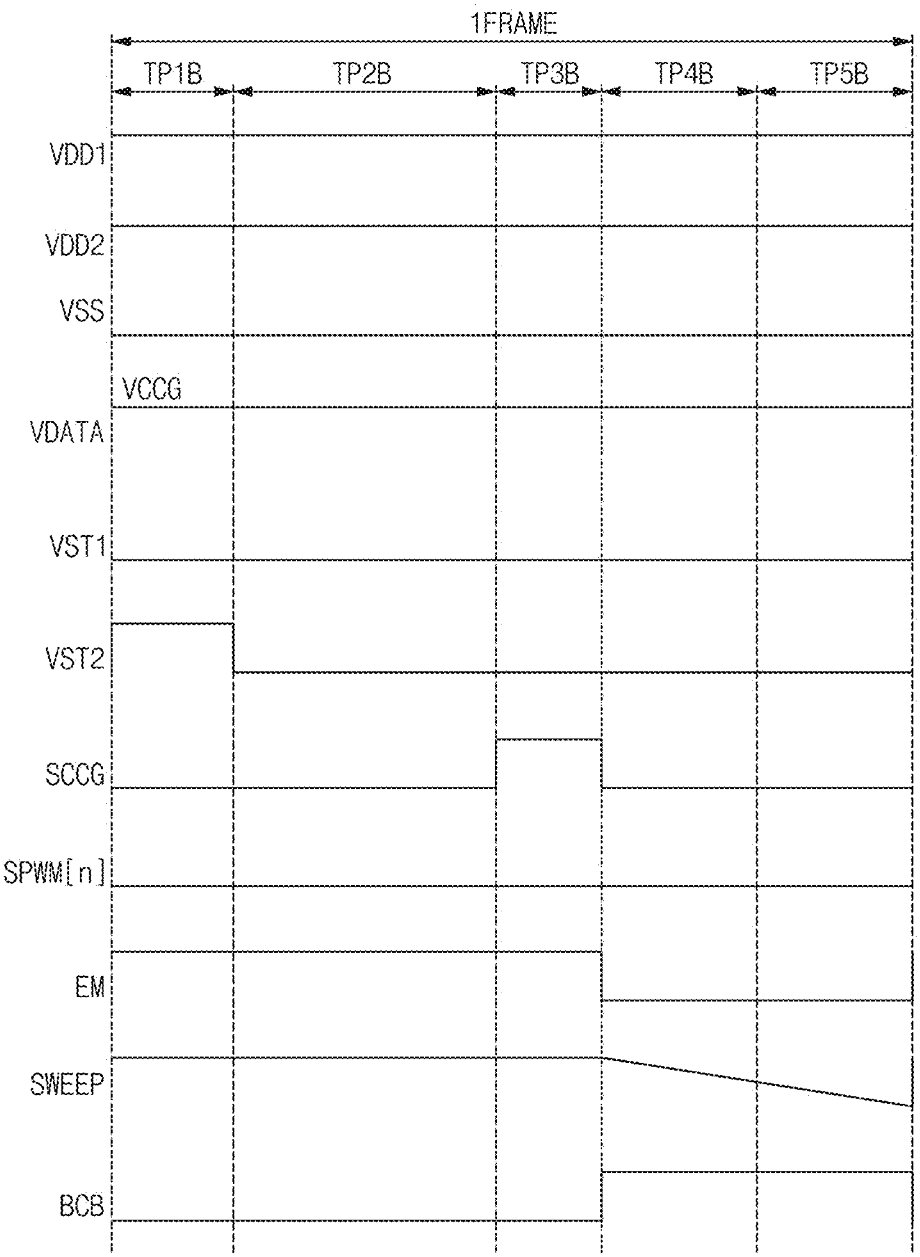
FIG. 11 is a timing diagram illustrating a timing applied to the pixel circuit in a holding frame.

FIG. 9 is a conceptual diagram illustrating a driving frequency of the display panel 100 of FIG. 1. FIG. 10 is a timing diagram illustrating a timing applied to the pixel circuit PX in a writing frame. FIG. 11 is a timing diagram illustrating a timing applied to the pixel circuit PX in a holding frame.

A display panel 100 according to the present embodiment is substantially same as the driving timing described with referring to FIG. 2 to FIG. 8 except that the display panel 100 is driven as a variable frequency, so that the same reference numerals will be used and any repetitive explanation concerning the above elements will be omitted.

Referring to FIG. 1, FIG. 9 to FIG. 11, the display panel 100 may be driven as the variable frequency. A first frame FR1 having a first frequency may include a first active period AC1 and a first blank period BL1. A second frame FR2 having a second frequency different from the first frequency may include a second active period AC2 and a second blank period BL2. A third frame FR3 having a third frequency different from the first frequency and the second frequency may include a third active period AC3 and a third blank period BL3.

A length of the first active period AC1 and a length of the second active period AC2 may be same, and a length of the first blank period BL1 and a length of the second blank period BL2 may be different.

A length of the second active period AC2 and a length of the third active period AC3 may be same, and a length of the second blank period BL2 and a length of the third blank period BL3 may be different.

A display apparatus supporting the variable frequency may include the writing frame in which a data voltage is written to a pixel and a holding frame in which the data voltage is not written to a pixel and only performs light emitting. The writing frame may be arranged within the active period AC1, AC2 and AC3. The holding frame may be arranged within the blank period BL1, BL2 and BL3.

For example, in the writing frame, the pulse width data voltage VPWM may be applied to the first transistor T1 and the light emitting element EE may emit light. For example, in the holding frame, the pulse width data voltage VPWM may not be applied to the first transistor T1 and the light emitting element EE may emit light.

A driving timing of the writing frame of FIG. 10 may be substantially same as the driving timing of FIG. 3.

A holding frame of FIG. 11 may include a first holding period TP1B, a second holding period TP2B, a third holding period TP3B, a fourth holding period TP4B and a fifth holding period TP5B.

In the first holding period TP1B, the first initialization signal VST1 may have an inactivation level, the second initialization signal VST2 may have an activation level, the first scan signal SPWM[n] may have an inactivation level, the second scan signal SCCG may have an inactivation level, the emission signal EM may have an inactivation level, the sweep signal SWEEP may have the high level and the light emitting element initialization signal BCB may have an activation level.

In the second holding period TP2B following the first holding period TP1B, the first initialization signal VST1 may have an inactivation level, the second initialization signal VST2 may have an inactivation level, the first scan signal SPWM[n] may have an inactivation level, the second scan signal SCCG may have an inactivation level, the emission signal EM may have an inactivation level, the sweep signal SWEEP may have the high level and the light emitting element initialization signal BCB may have an activation level.

In the third holding period TP3B following the second holding period TP2B, the first initialization signal VST1 may have an inactivation level, the second initialization signal VST2 may have an inactivation level, the first scan signal SPWM[n] may have an inactivation level, the second scan signal SCCG may have an activation level, the emission signal EM may have an inactivation level, the sweep signal SWEEP may the high level and the light emitting element initialization signal BCB may have an activation level.

In the fourth holding period TP4B following the third holding period TP3B, the first initialization signal VST1 may have an inactivation level, the second initialization signal VST2 may have an inactivation level, the first scan signal SPWM[n] may have an inactivation level, the second scan signal SCCG may have an inactivation level, the emission signal EM may have an activation level, the sweep signal SWEEP may be gradually decreased from the high level to the low level and the light emitting element initialization signal BCB may have an inactivation level.

In the fifth holding period TP5B following the fourth holding period TP4B, the first initialization signal VST1 may have an inactivation level, the second initialization signal VST2 may have an inactivation level, the first scan signal SPWM[n] may have an inactivation level, the second scan signal SCCG may have an inactivation level, the emission signal EM may have an activation level, the sweep signal SWEEP may be gradually decreased to the low level and the light emitting element initialization signal BCB may have an inactivation level.

In the holding frame, the first initialization signal VST1 and the first scan signal SPWM[n] may have an inactivation level. In the holding frame, the data voltage VDATA may have the constant current voltage VCCG.

Figure 12:
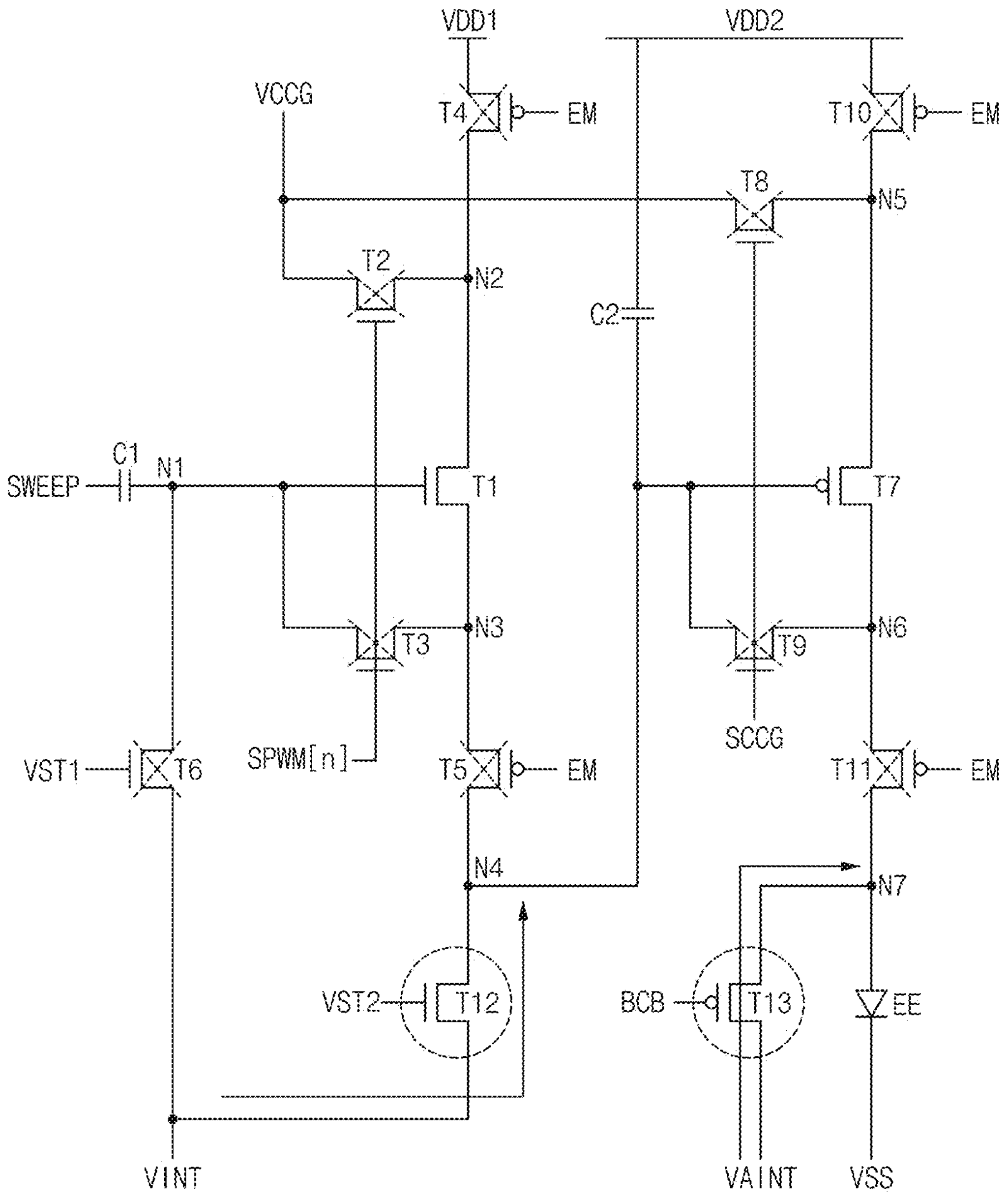
FIG. 12 is a circuit diagram illustrating an operation of the pixel circuit of FIG. 2 in a first holding period of FIG. 11.

FIG. 12 is a circuit diagram illustrating an operation of the pixel circuit PX of FIG. 2 in a first holding period TP1B of FIG. 11.

Referring to FIG. 11 and FIG. 12, in the first holding period TP1B following the writing frame, the first initialization signal VST1 may have an inactivation level and the sweep signal SWEEP may have a high level. The sixth transistor T6 may be turned off in response to the first initialization signal VST1. The first capacitor C1 may couple the sweep signal SWEEP and apply a coupling voltage to the first node N1. Accordingly, a voltage of the first node N1 may be pulse width compensated voltage of the writing frame.

In the holding period TP1B, the twelfth transistor T12 may be turned on in response to the second initialization signal VST2. Accordingly, the initialization voltage VINT may be applied to the fourth node N4.

In the first holding period TP1B, the thirteenth transistor T13 may be turned on in response to the light emitting element initialization signal BCB. Accordingly, the light emitting element initialization voltage VAINT may be applied to the seventh node N7.

Figure 13:
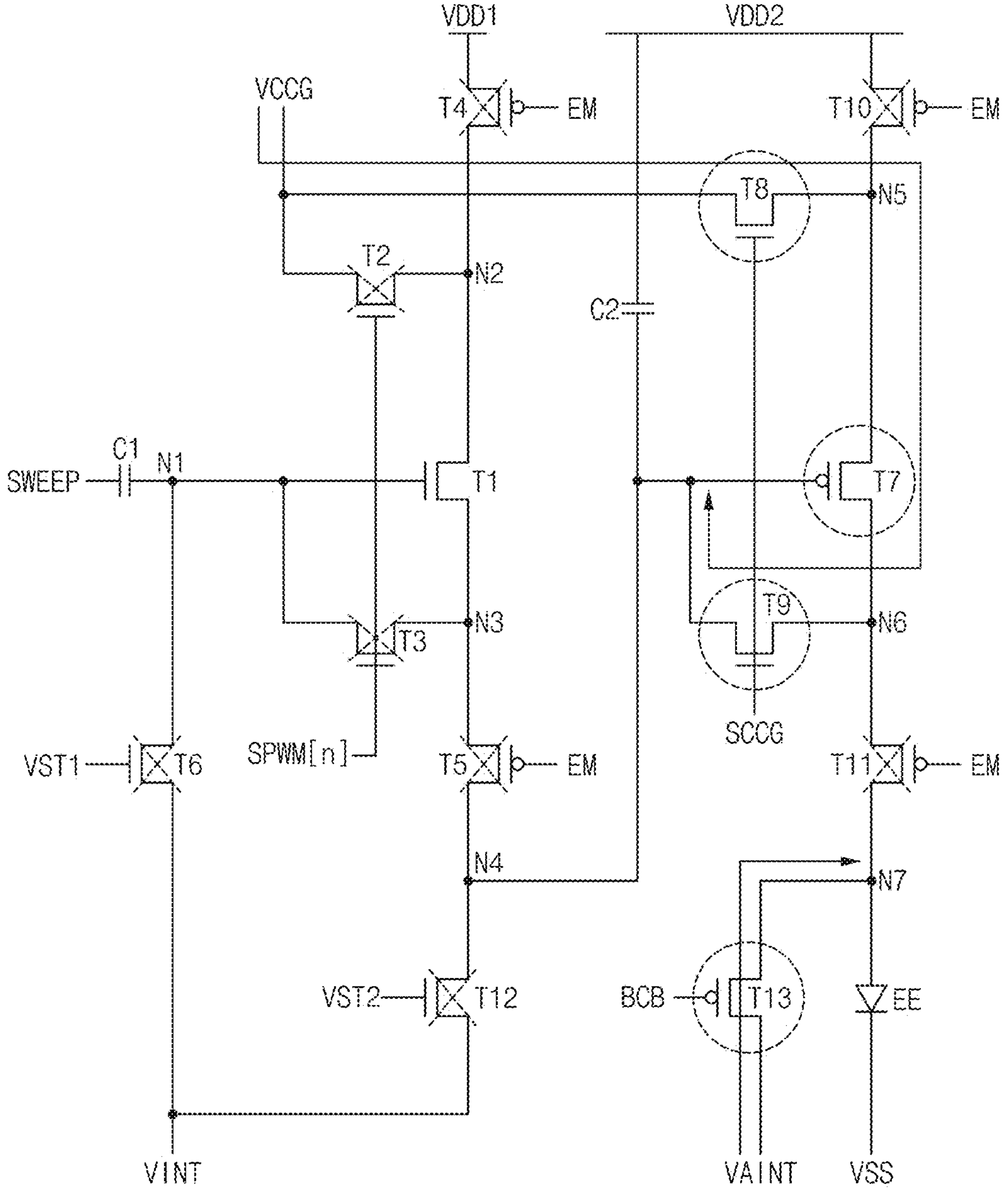
FIG. 13 is a circuit diagram illustrating an operation of the pixel circuit of FIG. 2 in a third holding period of FIG. 11.

FIG. 13 is a circuit diagram illustrating an operation of the pixel circuit PX of FIG. 2 in a third holding period TP3B of FIG. 11.

Referring to FIG. 11 and FIG. 13, in the third holding period TP3B following the first holding period TP1B, the second scan signal SCCG may have an activation level. In the third period TP3B, the eighth transistor T8 may be turned on in response to the second scan signal SCCG. In the third period TP3B, the ninth transistor T9 may be turned on in response to the second scan signal SCCG. Accordingly, the constant current voltage VCCG may be applied to the fourth node N4. In the third holding period TP3B, a voltage of the fourth node N4 may be the constant current voltage.

Figure 14:
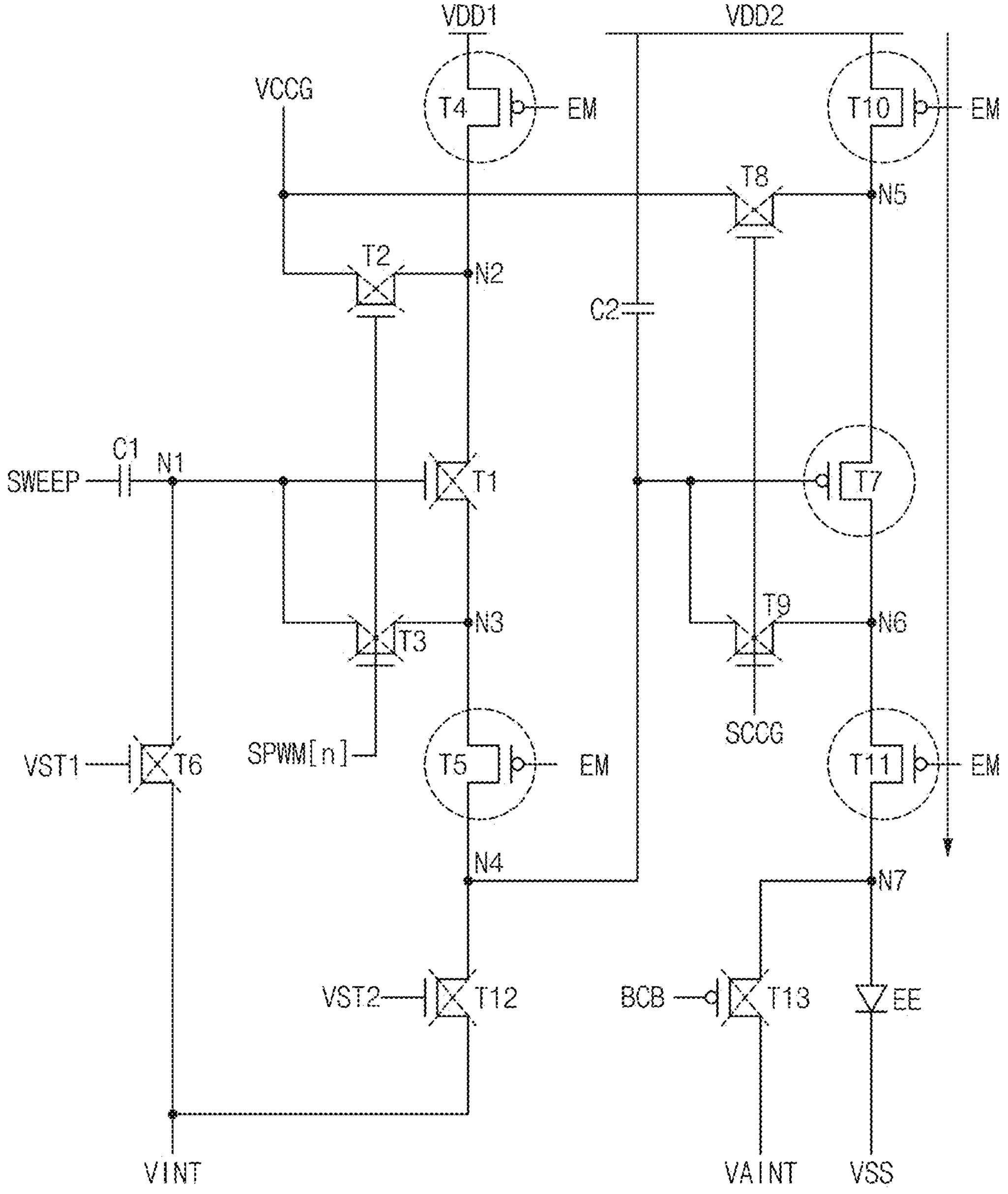
FIG. 14 is a circuit diagram illustrating an operation of the pixel circuit of FIG. 2 in a fourth holding period of FIG. 11.

FIG. 14 is a circuit diagram illustrating an operation of the pixel circuit PX of FIG. 2 in a fourth holding period TP4B of FIG. 11.

Referring to FIG. 11 and FIG. 14, in the fourth holding period TP4B, the fourth transistor T4 may be turned on in response to the emission signal EM. In the fourth holding period TP4B, the fifth transistor T5 may be turned on in response to the emission signal EM. In the fourth holding period TP4B, the tenth transistor T10 may be turned on in response to the emission signal EM. In the fourth holding period TP4B, the eleventh transistor T11 may be turned on in response to the emission signal EM. Additionally, the thirteenth transistor T13 may be turned off in response to the light emitting element initialization signal BCB. Accordingly, the driving current may be applied to the light emitting element EE. Accordingly, the light emitting element EE may emit light.

In the fourth holding period TP4B, the sweep signal SWEEP may be gradually decreased from the high level to the low level. Accordingly, a voltage of the first node N1 may be gradually decreased.

Figure 15:
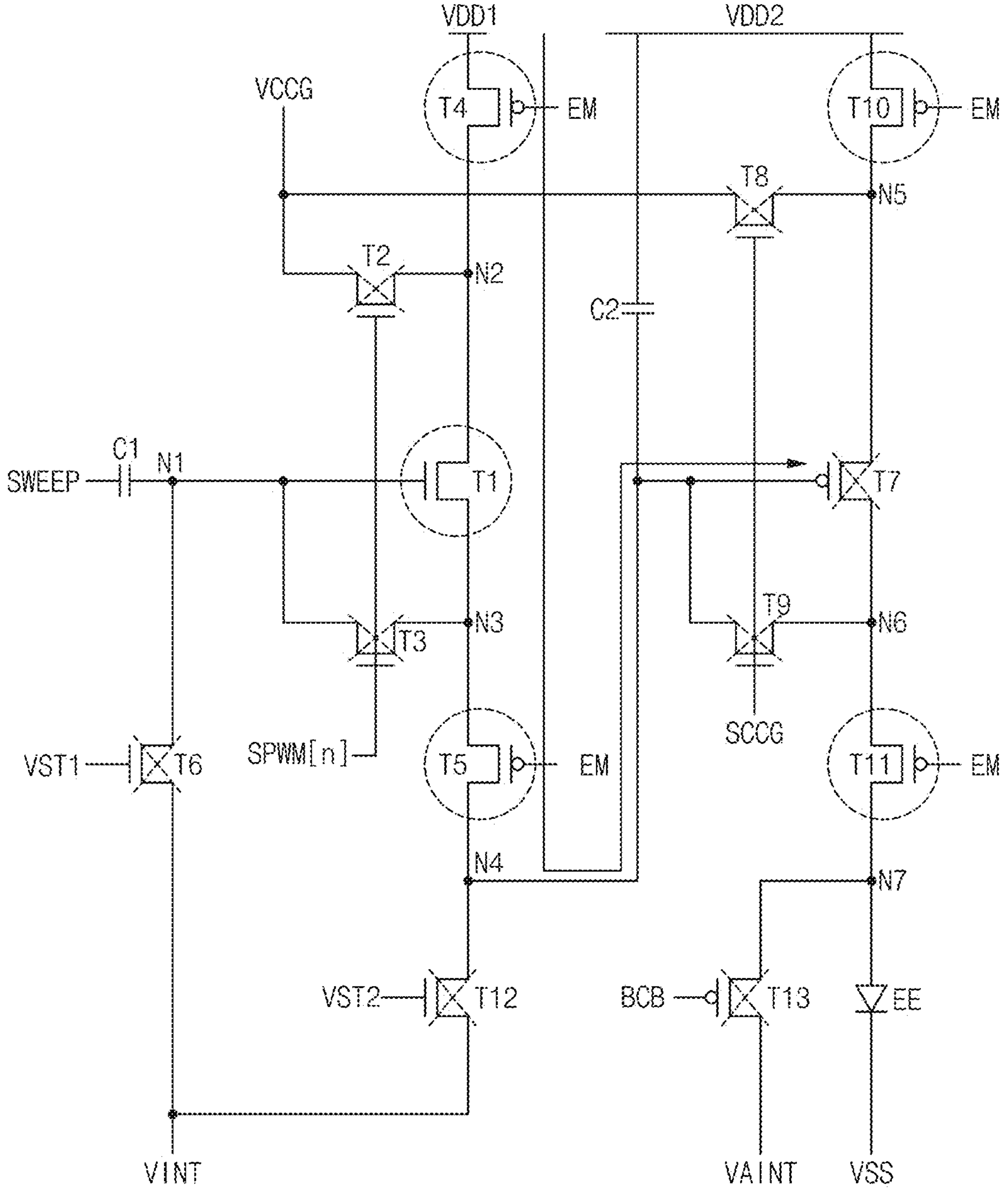
FIG. 15 is a circuit diagram illustrating an operation of the pixel circuit of FIG. 2 in a fifth holding period of FIG. 11.

FIG. 15 is a circuit diagram illustrating an operation of the pixel circuit PX of FIG. 2 in a fifth holding period TP5B of FIG. 11.

Referring to FIG. 11 and FIG. 15, in the fifth holding period TP5B, the sweep signal SWEEP may be gradually decreased to the low level. A voltage of the first node NI may be gradually decreased. When the voltage of the first node N1 is lower than the threshold voltage of the first transistor T1, the first transistor T1 may be turned on. When the first transistor T1 is turned on, the first power voltage VDD1 may be applied to the fourth node N4. When the first power voltage VDD1 is applied to the fourth node N4, the seventh transistor T7 may be turned off. When the seventh transistor T7 is turned off, the light emitting element EE may stop emitting.

A timepoint in which the first transistor Tl is turned on may be determined by the pulse width data voltage VPWM applied to the control electrode of the first transistor T1 in the writing frame.

According to the present embodiment, the pixel circuit PX may include 13 transistors and 2 capacitors. The pixel circuit PX which is driven by pulse width modulation, performs internal compensation of threshold voltage, and includes a small number of transistors, so that an integration of pixel circuit PX may be effectively improved. Accordingly, the pixel circuit PX may be applicable to ultra-high resolution display apparatus.

Additionally, the second transistor T2, the third transistor T3, the sixth transistor T6, the eighth transistor T8, the ninth transistor T9 and the twelfth transistor T12 included in the pixel circuit PX may be N-type transistors. Accordingly, the pixel circuit PX may be stably operated by using low power voltage. So, through the second transistor T2, the third transistor T3, the sixth transistor T6, the eighth transistor T8, the ninth transistor T9 and the twelfth transistor T12, a power consumption of the display apparatus may be effectively reduced.

Additionally, the first transistor T1 and the seventh transistor T7 may be P-type transistors, so that a mobility may be effectively improved.

Additionally, the light emitting element initialization voltage VAINT applied to the first electrode of the thirteenth transistor T13 may be lower than the third power voltage VSS applied to the cathode of the light emitting element EE, a black characteristic of the pixel circuit PX may be effectively improved.

Additionally, the sweep signal SWEEP may be the global signal, so that a power consumption of the display apparatus may be effectively reduced. Additionally, the first initialization signal VST1, the second initialization signal VST2, the second scan signal SCCG, the emission signal EM and the light emitting element initialization signal BCB may be the global signal, so that a power consumption of the display apparatus may be further improved.

Additionally, the emission signal EM may be the global signal, so that the display apparatus may not include an emission driver. Accordingly, an integration of the display apparatus may be further improved. Additionally, a power consumption may be further improved.

Additionally, in the present embodiment, the pixel circuit PX may be driven as a variable frequency, so that a power consumption of the display apparatus may be effectively reduced.

Additionally, in the present embodiment, in the holding frame, the data voltage VDATA may have the constant current voltage VCCG and the first initialization signal VST1 and the first scan signal SPWM[n] may have an inactivation level, so that a power consumption of the display apparatus may be further reduced.

Figure 16:
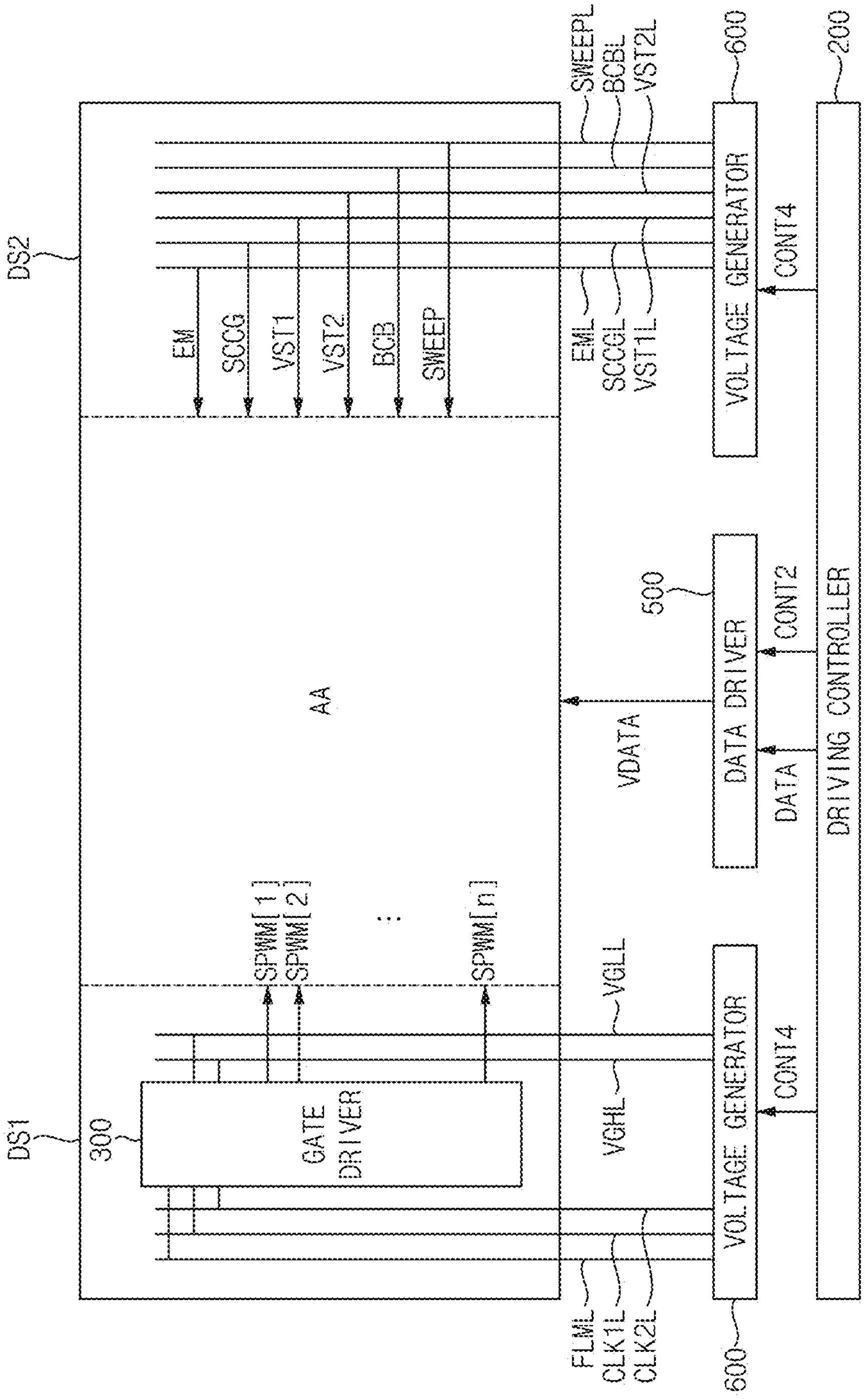
FIG. 16 is a diagram illustrating an example of a location of a driving controller, a data driver, a gate driver, a voltage generator and a display panel included in a display apparatus of FIG. 1.

FIG. 16 is a diagram illustrating an example of a location of a driving controller 200, a data driver 500, a gate driver 300, a voltage generator 600 and a display panel 100 included in a display apparatus of FIG. 1.

Referring to FIG. 1 and FIG. 16, the display panel 100 may include the display region AA and the peripheral region. The peripheral region may include a first peripheral region DS1 and a second peripheral region DS2. The display panel 100 may include a vertical start signal line FLML, a first clock signal line CLK1L, a second clock signal line CLK2L, a high voltage line VGHL, a low voltage line VGLL, an emission line EML, a second scan signal line SCCGL, a first initialization line VST1L, a second initialization line VST2L, a light emitting element initialization line BCBL and a sweep signal line SWEEPL. The vertical start signal FLM may be applied to the vertical start signal line FLML. The first clack signal CLK1 may be applied to the first clock signal line CLK1L. The second clack signal CLK2 may be applied to the second clock signal line CLK2L. The high voltage VGH may be applied to the high voltage line VGHL. The low voltage VGL may be applied to the low voltage line VGLL. The emission signal EM may be applied to the emission line EML. The second scan signal SCCG may be applied to the second scan signal line SCCGL. The first initialization signal VST1 may be applied to the first initialization line VST1L. The second initialization signal VST2 may be applied to the second initialization line VST2L. The light emitting element initialization signal BCB may be applied to the slight emitting element initialization line BCBL. The sweep signal SWEEP may be applied to the sweep signal line SWEEPL.

In the present embodiment, the gate driver 300 may receive the vertical start signal FLM, the first clock signal CLK1, the second clock signal CLK2, the high voltage VGH and the low voltage VGL from the voltage generator 600. The gate driver 300 may generate the first scan signals SPWM[1], SPWM[2] to SPWM[n] based on the vertical start signal FLM, the first clock signal CLK1, the second clock signal CLK2, the high voltage VGH and the low voltage VGL The gate driver 300 may be disposed on the first peripheral region DS1. The emission line EML, the second scan signal line SCCGL, the first initialization line VST1L, the second initialization line VST2L, the light emitting element initialization line BCBL and the sweep signal line SWEEPL may be disposed on the second peripheral region DS2. In contrast, when the gate driver 300 is disposed on the second peripheral region DS2, the emission line EML, the second scan signal line SCCGL, the first initialization line VST1L, the second initialization line VST2L, the light emitting element initialization line BCBL and the sweep signal line SWEEPL may be disposed on the first peripheral region DS1.

A size of the first peripheral region DS1 and a size of the second peripheral region DS2 may be changed by user.

In the present embodiment, the emission signal EM, the sweep signal SWEEP, the second scan signal SCCG, the first initialization signal VST1 and the second initialization signal VST2. Accordingly, the display apparatus may not include the emission driver and a sweep signal driver. Accordingly, a power consumption of the display apparatus may be further reduced.

Figure 17:
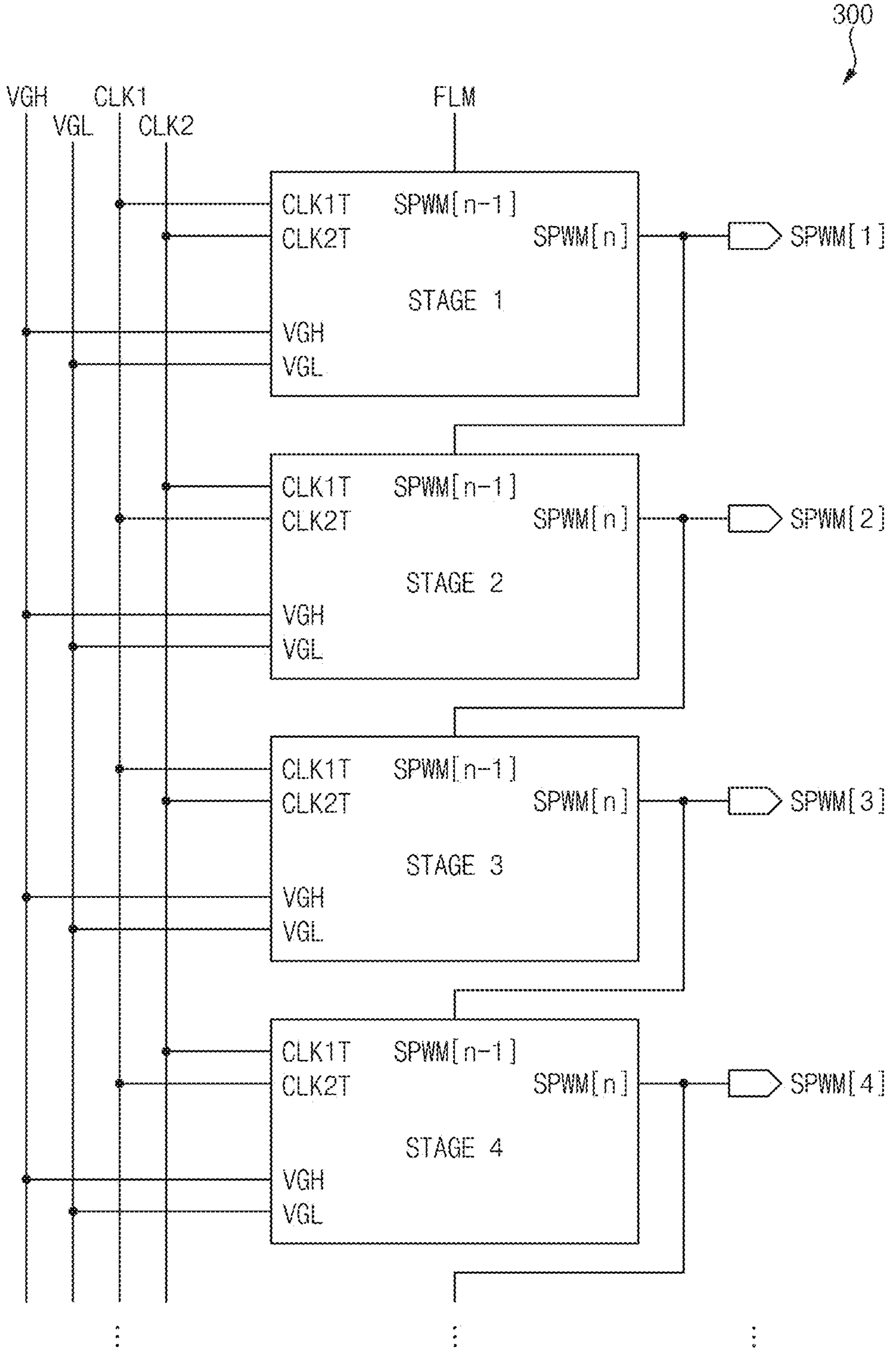
FIG. 17 is a block diagram illustrating a gate driver included in a display apparatus of FIG. 1.

FIG. 17 is a block diagram illustrating a gate driver 300 included in a display apparatus of FIG. 1.

Referring to FIG. 1, FIG. 16 and FIG. 17, the gate driver 300 may include a plurality of stages STAGE 1, STAGE 2, STAGE 3, STAGE 4, . . . in which receives the vertical start signal FLM, a first clock signal CLK1 and a second clock signal CLK2, and sequentially outputs the first scan signals SPWM[1], SPWM[2], SPWM[3], SPWM[4], . . . to a plurality of pixels row by row.

The first clock signal CLK1 and the second clock signal CLK2 may be applied to a first clock terminal CLK1T and a second clock terminal CLK2T of the first stage STAGE 1, respectively. The first clock signal CLK1 and the second clock signal CLK2 may be applied to the second clock terminal CLK2T and the first clock terminal CLK1T of the second stage STAGE 2, respectively. Likewise, the first clock signal CLK1 and the second clock signal CLK2 may be applied to the first clock terminal CLK1T and the second clock terminal CLK2T of the third stage STAGE 3, respectively. The first clock signal CLK1 and the second clock signal CLK2 may be applied to the second clock terminal CLK2T and the first clock terminal CLK1T of the fourth stage STAGE 4, respectively.

Figure 18:
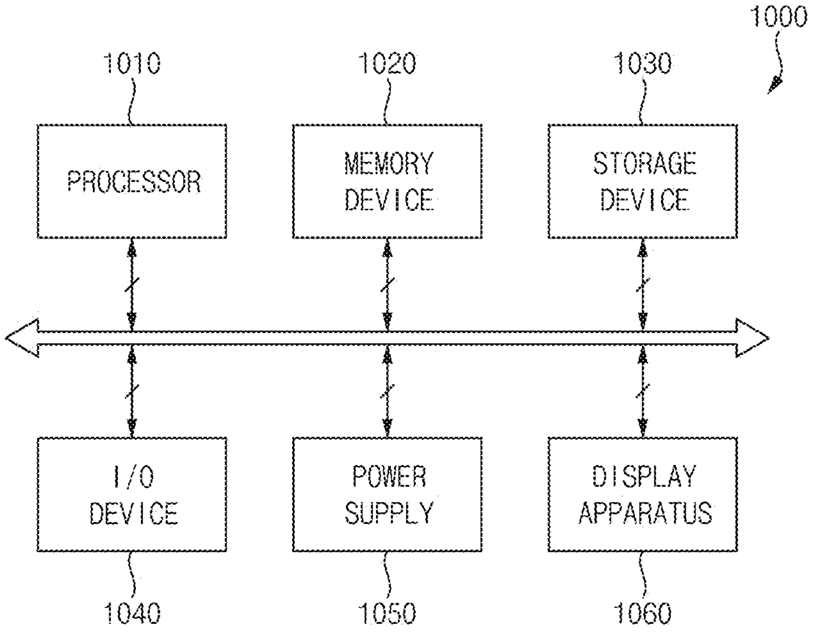
FIG. 18 is a block diagram illustrating an electronic device according to an embodiment of the present invention.
Figure 19:
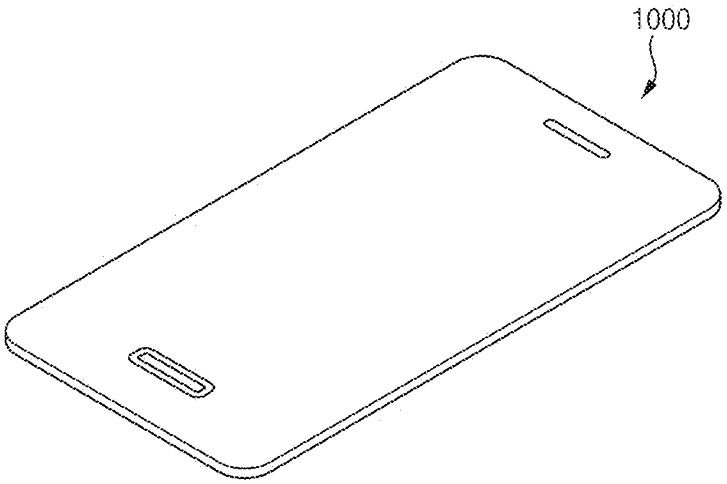
FIG. 19 is a diagram illustrating an example in which the electronic device of FIG. 18 is implemented as a smart phone.

FIG. 18 is a block diagram illustrating an electronic device 1000 according to an embodiment of the present invention. FIG. 19 is a diagram illustrating an example in which the electronic device of FIG. 18 is implemented as a smart phone.

Referring to FIG. 18, the electronic device 1000 may include a processor 1010, a memory device 1020, a storage device 1030, an input/output (I/O) device 1040, a power supply 1050, and a display device 1060. Here, the display device 1060 may be the display apparatus of FIG. 1. Additionally, the electronic device 1000 may further include a plurality of ports for communicating with a video card, a sound card, a memory card, a universal serial bus (USB) device, other electronic devices, etc.

In an embodiment, as illustrated in FIG. 19, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG, the app-on signal APPON and the input control signal CONT to the driving controller 200 of FIG. 1.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display device 1060 may be included in the I/O device 1040. The power supply 1050 may provide power for operations of the electronic device 1000. The display device 1060 may be coupled to other components via the buses or other communication links.

Referring to FIG. 19, the electronic device of the present invention is shown implemented as a smartphone, but the present invention is not limited thereto. The electronic device may be a television, a monitor, a laptop computer, or a tablet. Additionally, the electronic device may be a car.

Figure 20:
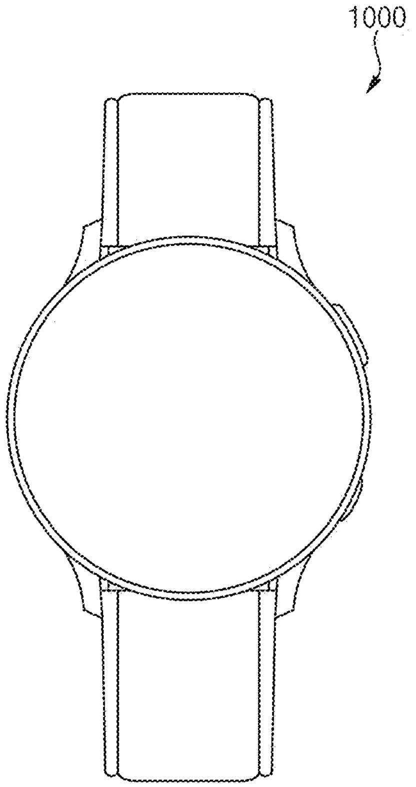
FIG. 20 is a diagram illustrating an example in which the electronic apparatus of FIG. 18 is implemented as a smart watch.

FIG. 20 is a diagram illustrating an example in which the electronic apparatus of FIG. 18 is implemented as a smart watch.

Referring to FIG. 18 and FIG. 20, the electronic device 1000 may be implemented as a smart watch. The smart watch may be an example of the electronic device 1000 requiring an ultra-high resolution display panel.

The display apparatus according to the embodiments may be applied to a display apparatus included in a computer, a notebook, a mobile phone, a smart phone, a smart pad, a PMP, a PDA, an MP3 player, or the like.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A pixel circuit comprising:

a first transistor including a control electrode connected to a first node, a first electrode connected to a second node and a second electrode connected to a third node;

a second transistor configured to apply a data voltage to the second node in response to a first scan signal;

a third transistor configured to connect the first node and the third node in response to the first scan signal;

a fourth transistor configured to apply a first power voltage to the second node in response to an emission signal;

a fifth transistor configured to connect the third node and a fourth node in response to the emission signal;

a sixth transistor configured to apply an initialization voltage to the first node in response to a first initialization signal;

a seventh transistor including a control electrode connected to the fourth node, a first electrode connected to a fifth node and a second electrode connected to a sixth node and configured to generate a driving current;

an eighth transistor configured to apply the data voltage to the fifth node in response to a second scan signal;

a tenth transistor configured to apply a second power voltage to the fifth node in response to the emission signal;

a twelfth transistor configured to apply the initialization voltage to the fourth node in response to a second initialization signal; and a light emitting element configured to emit light based on the driving current, wherein the first transistor and the seventh transistor are P-type transistors, and the second transistor, the third transistor and the eighth transistor are N-type transistors, and wherein a sweep signal is applied to the first node, and the sweep signal is a global signal which has a same timing across at least two pixel-rows.

2. The pixel circuit of claim 1, wherein the second scan signal, the emission signal, the first initialization signal and the second initialization signal are the global signal.

3. The pixel circuit of claim 1, further comprising:

a ninth transistor configured to connect the fourth node and the sixth node in response to the second scan signal;

an eleventh transistor configured to connect the sixth node and a seventh node in response to the emission signal; and a thirteenth transistor configured to apply a light emitting element initialization voltage to a first electrode of the light emitting element in response to a light emitting element initialization signal.

4. The pixel circuit of claim 3, wherein the light emitting element initialization signal is the global signal.

5. The pixel circuit of claim 3, wherein the light emitting element includes the first electrode connected to the seventh node and a second electrode configured to receive a third power voltage, and wherein the light emitting element initialization voltage is lower than the third power voltage.

6. The pixel circuit of claim 3, wherein the fourth transistor, the fifth transistor, the tenth transistor, the eleventh transistor and the thirteenth transistor are P-type transistors, and the sixth transistor, the ninth transistor and the twelfth transistor are N-type transistors.

7. The pixel circuit of claim 1, wherein in an emission-on period, the first transistor is turned off, and the light emitting element emits light while the seventh transistor is turned on, and wherein in an emission-off period following the emission-on period, when the first transistor is turned on, the seventh transistor is turned off and the light emitting element stops emitting light.

8. The pixel circuit of claim 1, wherein in a first period of a frame period in which the pixel circuit is driven, the first initialization signal has an activation level, the second initialization signal has an activation level and the sweep signal has a high level, and the sixth transistor is turned on and the twelfth transistor is turned on.

9. The pixel circuit of claim 8, wherein in a second period following the first period, the data voltage has a pulse width data voltage, the first initialization signal has an inactivation level, the second initialization signal has an inactivation level, the first scan signal has an activation level, the second transistor is turned on, and the third transistor is turned on.

10. The pixel circuit of claim 9, wherein in a third period following the second period, the data voltage has a constant current voltage, the first scan signal has an inactivation level, the second scan signal has an activation level, and the eighth transistor is turned on.

11. The pixel circuit of claim 10, wherein in a fourth period following the third period, the emission signal has an activation level, the sweep signal is decreased from the high level to a low level lower than the high level.

12. The pixel circuit of claim 1, wherein a frame period in which the pixel circuit is driven includes a writing frame in which a pulse width data voltage is applied to the pixel circuit and the light emitting element emits light and a holding frame in which the pulse width data voltage is not applied to the pixel circuit and the light emitting element emits light.

13. The pixel circuit of claim 12, wherein in a first holding period of the holding frame, the sweep signal has a high level, the first initialization signal has an inactivation level, the second initialization signal has an activation level, the emission signal has an inactivation level, the sixth transistor is turned off and the twelfth transistor is turned on.

14. The pixel circuit of claim 13, wherein in a second holding period following the first holding period, the second initialization signal has an inactivation level, the first scan signal has an inactivation level, and the twelfth transistor is turned off.

15. The pixel circuit of claim 14, wherein in a third holding period following the second holding period, the data voltage has a constant current voltage, the second scan signal has an activation level, and the eighth transistor is turned on.

16. The pixel circuit of claim 15, wherein in a fourth holding period following the third holding period, the emission signal has an activation level, the sweep signal is decreased from the high level to a low level lower than the high level.

17. The pixel circuit of claim 16, wherein in the first holding period to the fourth holding period, the data voltage has the constant current voltage, and the first scan signal has the inactivation level.

18. The pixel circuit of claim 16, wherein in the first holding period to the fourth holding period, the first initialization signal has the inactivation level.

19. A display apparatus comprising:

a display panel including a pixel circuit, a display region, a first peripheral region and a second peripheral region;

a gate driver configured to apply a first scan signal to the display region;

a data driver configured to apply a data voltage to the display region;

a voltage generator configured to apply a global signal which has a same timing across at least two pixel-rows to the display region; and a driving controller configured to control the gate driver, the data driver and the voltage generator, wherein the pixel circuit includes:

a first transistor including a control electrode connected to a first node, a first electrode connected to a second node and a second electrode connected to a third node;

a second transistor configured to apply the data voltage to the second node in response to a first scan signal;

a third transistor configured to connect the first node and the third node in response to the first scan signal;

a fourth transistor configured to apply a first power voltage to the second node in response to an emission signal;

a fifth transistor configured to connect the third node and a fourth node in response to the emission signal;

a sixth transistor configured to apply an initialization voltage to the first node in response to a first initialization signal;

a seventh transistor including a control electrode connected to the fourth node, a first electrode connected to a fifth node and a second electrode connected to a sixth node and configured to generate a driving current;

an eighth transistor configured to apply the data voltage to the fifth node in response to a second scan signal;

a tenth transistor configured to apply a second power voltage to the fifth node in response to the emission signal;

a twelfth transistor configured to apply the initialization voltage to the fourth node in response to a second initialization signal; and a light emitting element configured to emit light based on the driving current, wherein the first transistor and the seventh transistor are P-type transistors, and the second transistor, the third transistor and the eighth transistor are N-type transistors, and wherein a sweep signal is applied to the first node, and the sweep signal is the global signal.

20. The display apparatus of claim 19, wherein the voltage generator applies a gate clock signal to the gate driver, and applies the emission signal, the first initialization signal, the second initialization signal, the second scan signal and the sweep signal to the display region.

21. The display apparatus of claim 20, wherein the gate driver is disposed on the first peripheral region, the display region is disposed between the first peripheral region and the second peripheral region, and wherein an emission line configured to receive the emission signal, a first initialization line configured to receive the first initialization signal, a second initialization line configured to receive the second initialization signal, a second scan signal line configured to receive the second scan signal and a sweep signal line configured to receive the sweep signal are disposed on the second peripheral region.

22. A pixel circuit comprising:

a light emitting element;

a pulse width driving circuit configured to generate a pulse width signal; and a constant current driving circuit configured to control an emission of the light emitting element based on the pulse width signal, wherein the pulse width driving circuit includes:

a pulse driving transistor configured to generate the pulse width signal based on a sweep signal which is a global signal that has a same timing across at least two pixel-rows;

a pulse writing transistor configured to apply a data voltage to a first electrode of the pulse driving transistor in response to a first scan signal which is a progressive signal that has a different timing across the at least two pixel-rows;

a pulse emission control transistor configured to apply a first power voltage to the first electrode of the pulse driving transistor in response to an emission signal; and a first initialization transistor configured to apply an initialization voltage to a control electrode of the pulse driving transistor in response to a first initialization signal, wherein the constant current driving circuit includes:

a constant current driving transistor configured to apply a driving current to the light emitting element in response to the pulse width signal;

a constant current writing transistor configured to apply a constant current voltage to a first electrode of the constant current driving transistor in response to a second scan signal;

a constant current emission control transistor configured to apply a second power voltage to the first electrode of the constant current driving transistor in response to the emission signal; and a second initialization transistor configured to apply the initialization voltage to a control electrode of the constant current driving transistor in response to a second initialization signal, and wherein the pulse driving transistor and the constant current driving transistor are P-type transistors and the pulse writing transistor and the constant current writing transistor are N-type transistors.

23. The pixel circuit of claim 22, wherein the emission signal, the first initialization signal, the second initialization signal and the second scan signal are the global signal.

24. The pixel circuit of claim 22, wherein the pulse width driving circuit further includes a pulse compensating transistor connected to the control electrode of the pulse driving transistor and a second electrode of the pulse driving transistor, and wherein the constant current driving circuit further includes a constant current compensating transistor connected to the control electrode of the constant current driving transistor and a second electrode of the constant current driving transistor.

25. The pixel circuit of claim 24, wherein the pulse compensating transistor and the constant current compensating transistor are N-type transistors.

26. An electronic device comprising:

a pixel circuit; and a power supply configured to provide power to the pixel circuit, wherein the pixel circuit comprises:

a first transistor including a control electrode connected to a first node, a first electrode connected to a second node and a second electrode connected to a third node;

a second transistor configured to apply a data voltage to the second node in response to a first scan signal;

a third transistor configured to connect the first node and the third node in response to the first scan signal;

a fourth transistor configured to apply a first power voltage to the second node in response to an emission signal;

a fifth transistor configured to connect the third node and a fourth node in response to the emission signal;

a sixth transistor configured to apply an initialization voltage to the first node in response to a first initialization signal;

a seventh transistor including a control electrode connected to the fourth node, a first electrode connected to a fifth node and a second electrode connected to a sixth node and configured to generate a driving current;

an eighth transistor configured to apply the data voltage to the fifth node in response to a second scan signal;

a tenth transistor configured to apply a second power voltage to the fifth node in response to the emission signal;

a twelfth transistor configured to apply the initialization voltage to the fourth node in response to a second initialization signal; and a light emitting element configured to emit light based on the driving current, wherein the first transistor and the seventh transistor are P-type transistors, and the second transistor, the third transistor and the eighth transistor are N-type transistors, and wherein a sweep signal is applied to the first node, and the sweep signal is a global signal which has a same timing across at least two pixel-rows.

* * * * *